United States Patent
Yoshizumi

(10) Patent No.: US 8,514,285 B2
(45) Date of Patent: Aug. 20, 2013

(54) IMAGE PROCESSING APPARATUS, IMAGE PROCESSING METHOD AND PROGRAM

(75) Inventor: Shingo Yoshizumi, Tokyo (JP)

(73) Assignee: Sony Corporation, Tokyo (JP)

( * ) Notice: Subject to any disclaimer, the term of this patent is extended or adjusted under 35 U.S.C. 154(b) by 313 days.

(21) Appl. No.: 12/901,725

(22) Filed: Oct. 11, 2010

(65) Prior Publication Data

US 2011/0157394 A1    Jun. 30, 2011

(30) Foreign Application Priority Data

Dec. 28, 2009 (JP) ................................ 2009-297172

(51) Int. Cl.
*H04N 5/225* (2006.01)
*H04N 7/18* (2006.01)
*H04N 5/228* (2006.01)
*H04N 5/222* (2006.01)
*G06K 9/00* (2006.01)
*G03B 17/00* (2006.01)

(52) U.S. Cl.
USPC ... 348/169; 348/143; 348/222.1; 348/333.01; 382/103; 396/153

(58) Field of Classification Search
USPC .................... 348/143–159, 169–172, 208.99, 348/208.14, 220.1, 222.1, 333.01–333.11; 382/103, 115, 118, 190; 396/153, 427
See application file for complete search history.

(56) References Cited

U.S. PATENT DOCUMENTS

| | | | | |
|---|---|---|---|---|
| 5,838,368 A | * | 11/1998 | Masunaga et al. | 348/211.9 |
| 6,323,898 B1 | * | 11/2001 | Koyanagi et al. | 348/169 |
| 2001/0002843 A1 | * | 6/2001 | Yata | 348/169 |
| 2002/0051057 A1 | * | 5/2002 | Yata | 348/142 |
| 2003/0142209 A1 | * | 7/2003 | Yamazaki et al. | 348/143 |
| 2004/0125984 A1 | * | 7/2004 | Ito et al. | 382/103 |
| 2005/0212913 A1 | * | 9/2005 | Richter | 348/170 |
| 2008/0159628 A1 | * | 7/2008 | Yoshida | 382/190 |
| 2009/0102942 A1 | * | 4/2009 | Yoshizumi et al. | 348/222.1 |
| 2009/0103778 A1 | | 4/2009 | Yoshizumi et al. | |
| 2010/0026872 A1 | * | 2/2010 | Jiang | 348/333.03 |

FOREIGN PATENT DOCUMENTS

JP    2009-100300    5/2009

OTHER PUBLICATIONS

U.S. Appl. No. 13/383,450, filed Jan. 11, 2012, Yoshizumi.
U.S. Appl. No. 13/384,898, Jan. 19, 2012, Yoshizumi.
U.S. Appl. No. 13/384,686, filed Jan. 18, 2012, Yoshizumi.

* cited by examiner

*Primary Examiner* — Michael Osinski
(74) *Attorney, Agent, or Firm* — Oblon, Spivak, McClelland, Maier & Neustadt, L.L.P.

(57) ABSTRACT

An image processing apparatus includes: a picture range variation control section adapted to variably set a picture range extent of image data; and a composition processing section adapted to detect whether or not a target image is included in a picture range while the picture range extent is variably set by the picture range variation control section and carry out, when one or more target images are detected, a composition determination process including confirmation of a different target image around the detected target image or images.

13 Claims, 24 Drawing Sheets

F I G . 2
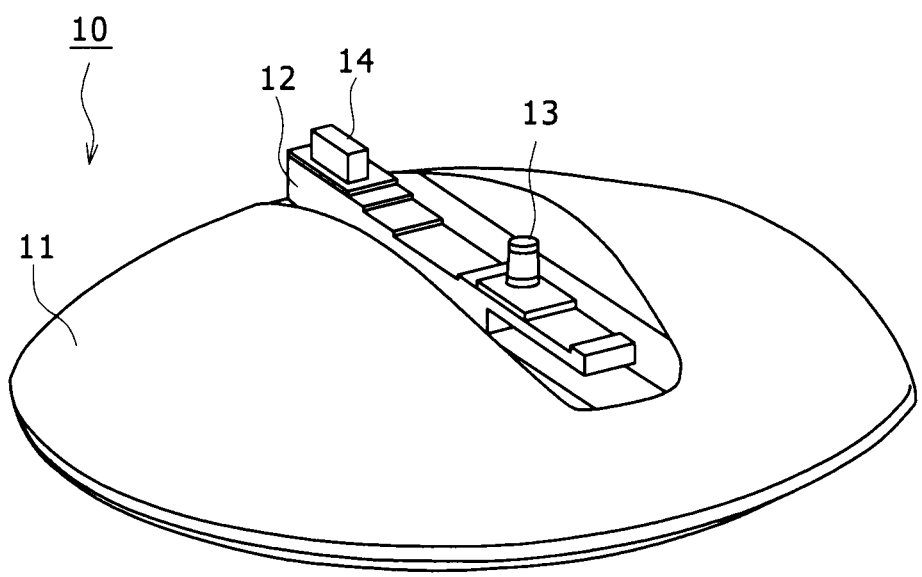

[PAN REFERENCE POSITION]

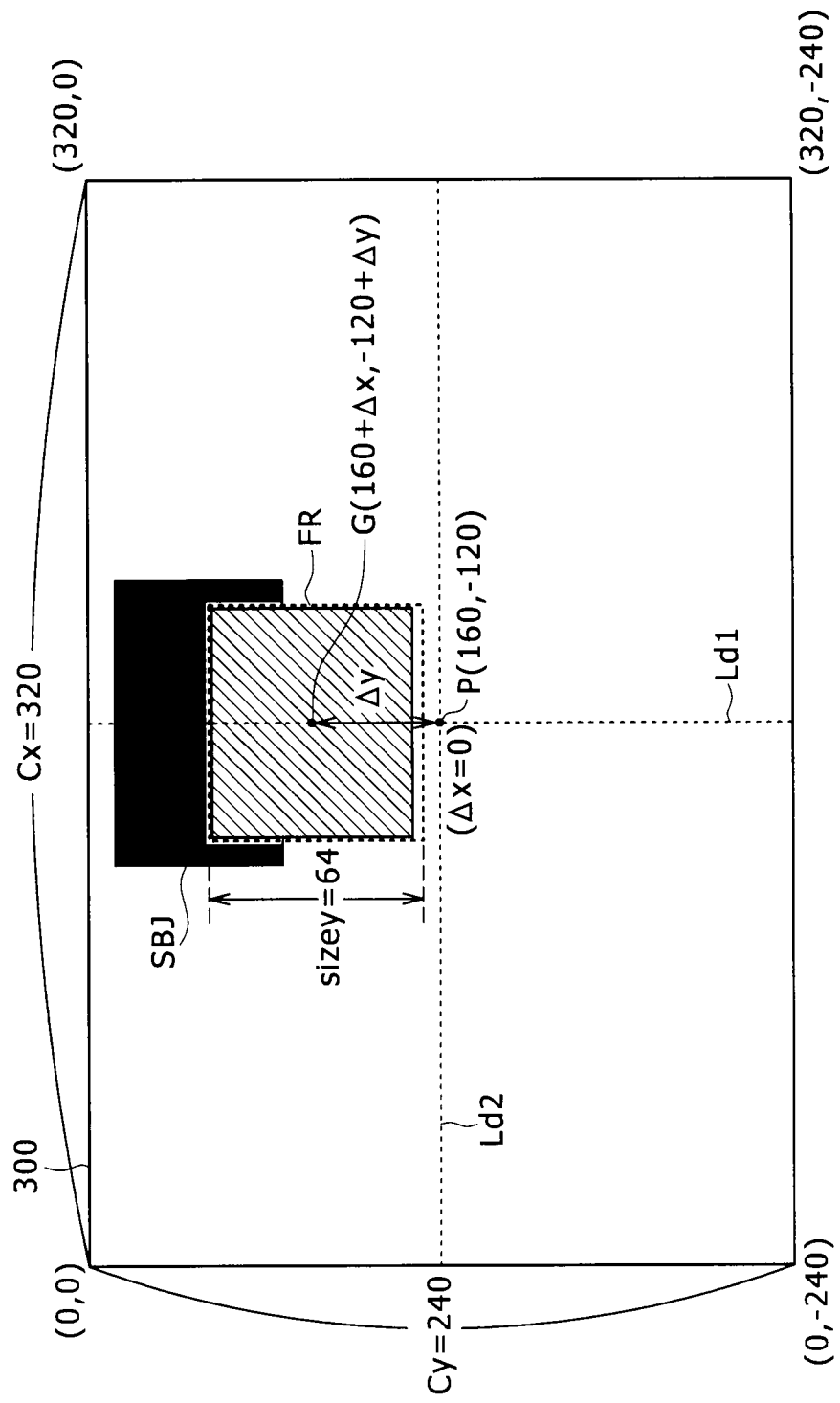

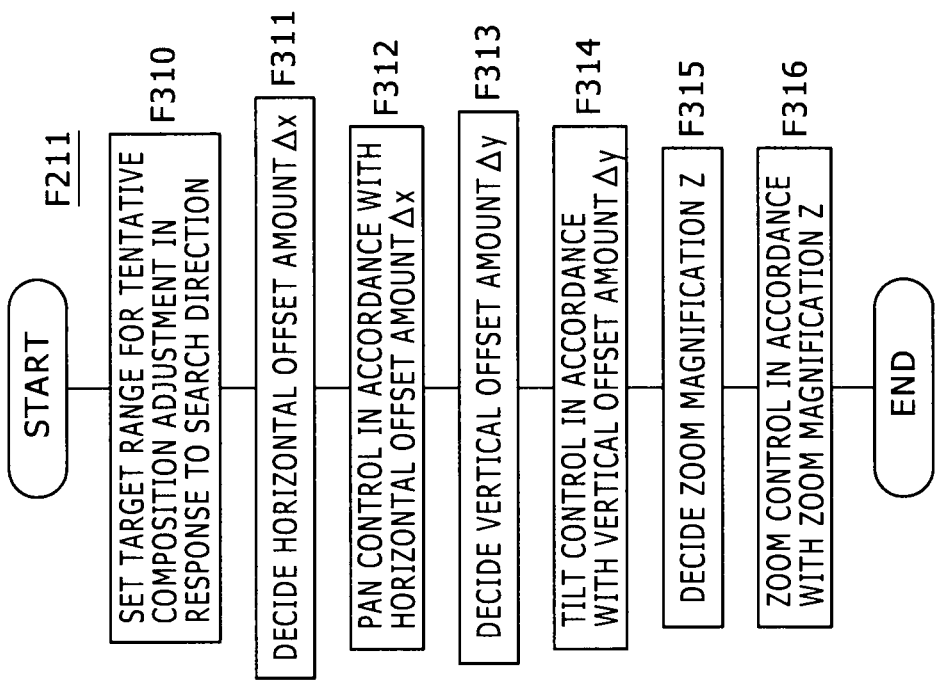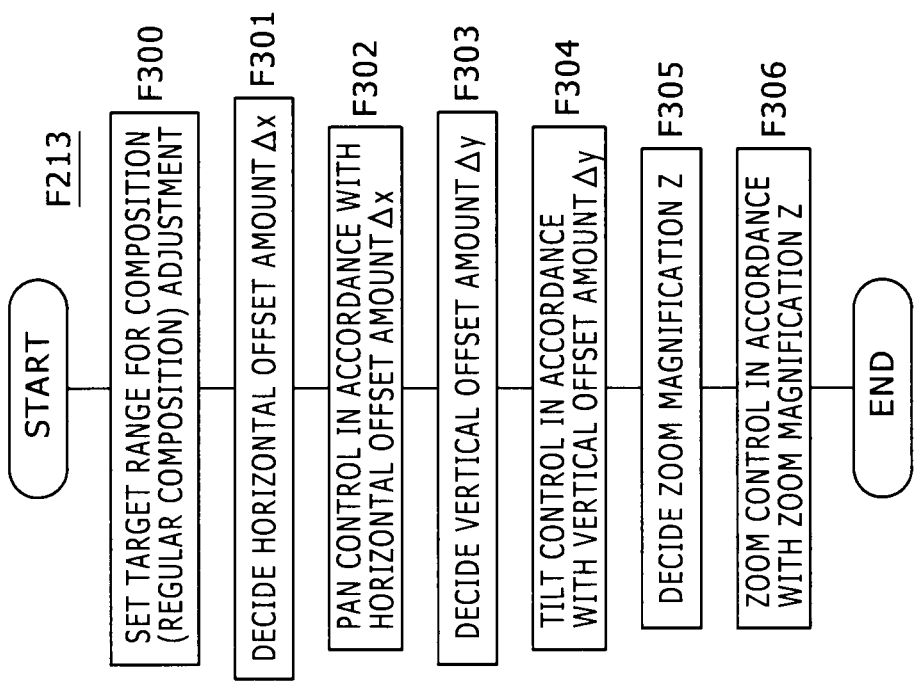

IMAGE PROCESSING APPARATUS, IMAGE PROCESSING METHOD AND PROGRAM

BACKGROUND OF THE INVENTION

1. Field of the Invention

This invention relates to an image processing apparatus and an image processing method, and more particularly to an image processing apparatus and an image processing method for carrying out a composition process in an image pickup apparatus or an image pickup system wherein the image pickup visual field is varied, for example, automatically to carry out image pickup. The present invention relates also to a program for implementing the image processing apparatus and the image processing method.

2. Description of the Related Art

An image pickup system is already known which includes a digital still camera and a camera platform which electrically varies the pan-tilt directions of the digital still camera. Further, a technique of carrying out automatic composition adjustment and automatic recording of a picked up image obtained by the composition adjustment is known and disclosed in Japanese Patent Laid-Open No. 2009-100300 (hereinafter referred to as Patent Document 1).

According to the technique disclosed in Patent Document 1, for example, a face detection technique is used to carry out search for an image pickup object as a person. In particular, while the digital still camera is rotated in the pan direction by the camera platform, detection of an image pickup object, that is, of the face of a person, reflected in a picture range is carried out.

Then, if an image pickup object is detected in the picture range as a result of such search for an image pickup object, then decision of an optimum composition in accordance with a detection form of the image pickup object such as, for example, the number, position, size and so forth of image pickup objects, within the picture range at the point of time is carried out (optimum composition decision). In short, angles for pan, tilt and zoom operations which are estimated to be optimum are determined.

Further, after the optimum angles for pan, tilt and zoom operations are determined by the optimum composition decision in this manner, adjustment of the pan, tilt and zoom angles is carried out using the determined angles as target angles (composition adjustment).

After completion of the composition adjustment, automatic recording of a picked up image is carried out.

With automatic image pickup operation by such automatic composition adjustment, that is, with picked up image automatic recording by such automatic composition adjustment, the necessity for any manual operation for image pickup by the user is eliminated, and recording of a picked up image of an optimum composition can be carried out automatically.

SUMMARY OF THE INVENTION

However, although a process for composition adjustment is carried out when an image pickup object is detected, such composition adjustment may possibly be carried out for only some of several image pickup objects.

For example, it is assumed that, when one person is detected as an image pickup object, a different person exists next to the person. Although composition adjustment is started in response to detection of an image pickup object, if such composition adjustment is started at a point of time when one person enters the image pickup visual field in the procedure of panning and tiling for searching for an image pickup object, then an optimum composition is decided taking only the single person as a target to carry out composition adjustment.

However, actually it occurs frequently that it is more preferable to carry out composition adjustment setting a plurality of persons including a particular person and some person next to the particular person as a target to take a better photograph.

Therefore, it is desirable to provide a composition processing method which carries out, upon automatic image pickup of a still picture and so forth, an optimum composition process including a number of image pickup objects such as persons as great as possible.

According to an embodiment of the present invention, there is provided an image processing apparatus including a picture range variation control section adapted to variably set a picture range extent of image data, and a composition processing section adapted to detect whether or not a target image is included in a picture range while the picture range extent is variably set by the picture range variation control section and carry out, when one or more target images are detected, a composition determination process including confirmation of a different target image around the detected target image or images.

The image data may be picked up image data in an image pickup apparatus for carrying out pickup of an image of an image pickup object and recording of picked up image data into or on a recording medium, the target image being an image of a target image pickup object, the picture range variation control section being an image pickup visual field variation control section for controlling driving of a variation mechanism for an image pickup visual field in the image pickup apparatus is provided, the composition processing section being an image pickup preparation processing section for detecting whether or not the target image pickup object is included in the image pickup visual field from the picked up image data of the image pickup apparatus while driving of the variation mechanism is controlled by the image pickup visual field variation control section and carrying out, when one or more target image pickup objects are detected, a composition determination process including confirmation of a different image pickup object around the detected image pickup object or objects is provided.

In this instance, the composition determination process may include a tentative composition adjustment process for carrying out, when one or more target image pickup objects are detected, composition adjustment while the image pickup visual field is varied so that a different image pickup object around the detected image pickup object or objects can be confirmed, and a regular composition adjustment process for varying the image pickup visual field in order to optimize a composition after completion of the tentative composition adjustment.

The image processing apparatus may be configured such that the composition adjustment process is carried out as a process for controlling driving of the variation mechanism so that the center of gravity regarding one or a plurality of detected image pickup objects is placed within a target range set in the picture range, and setting of the target range is different between the tentative composition adjustment process and the regular composition adjustment process.

The target range upon the tentative composition adjustment process may be set such that a variation width of the image pickup visual field is greater than a variation width of the image pickup visual field upon the regular composition adjustment process.

According to another embodiment of the present invention, there is provided an image processing method for image data, including the steps of variably setting a picture range extent of image data, detecting whether or not a target image is included in a picture range while the picture range extent is variably set, and carrying out, when one or more target images are detected, a composition determination process including confirmation of a different target image around the detected target image.

According to a further embodiment of the present invention, there is provided an image processing method for an image pickup apparatus or an image pickup system which includes a still picture image pickup section for carrying out image pickup of an image pickup object and recording of picked up image data into or on a recording medium and an image pickup visual field variation mechanism for the still picture image pickup section, including the steps of detecting whether or not a target image pickup object is included in an image pickup visual field from the picked up image data of the image pickup apparatus while driving of the variation mechanism is controlled, and carrying out, when one or more target image pickup objects are detected, a composition determination process including confirmation of a different image pickup object around the detected image pickup object or objects.

According to a still further embodiment of the present invention, there is provided a control processing program for an image processing apparatus for carrying out a process for image data, the control processing program causing a calculation processing apparatus to execute the steps of variably setting a picture range extent of image data, detecting whether or not a target image is included in a picture range while the picture range extent is variably set, and carrying out, when one or more target images are detected, a composition determination process including confirmation of a different target image around the detected target image.

According to a yet further embodiment of the present invention, there is provided a control processing program for an image pickup apparatus or an image pickup system which includes a still picture image pickup section for carrying out image pickup of an image pickup object and recording of picked up image data into or on a recording medium and an image pickup visual field variation mechanism for the still picture image pickup section, the control processing program causing a calculation processing apparatus to execute the steps of detecting whether or not a target image pickup object is included in an image pickup visual field from the picked up image data of the image pickup apparatus while driving of the variation mechanism is controlled, and carrying out, when one or more target image pickup objects are detected, a composition determination process including confirmation of a different image pickup object around the detected image pickup object or objects.

In the image processing apparatus, image processing methods and programs, when one or more target images or target image pickup objects are detected, the composition determination process including the process of confirming a different target image or image pickup object around the detected target image or images, that is, around the detected image pickup object or objects, is carried out. Consequently, not only composition adjustment is carried out in response to local detection of a target image or image pickup object. In particular, where a different target image or image pickup object exists around the detected target image or images, detection of a target image or image pickup object is carried out in a greater range, and adjustment to an optimum composition including all of such target images or image pickup objects can be carried out.

The image processing apparatus, image processing methods and programs are advantageous in that composition adjustment to a more preferable still picture can be carried out by executing not a composition process which is directed to local detection of a target image or image pickup object but a composition adjustment process after it is confirmed whether or not some other target image or image pickup object exists around a detected target image or image pickup object.

BRIEF DESCRIPTION OF THE DRAWINGS

FIG. 2 is a perspective view of a camera platform which is another component of the image pickup system;

FIGS. 11 and 12 are diagrammatic views illustrating a basic composition process;

FIGS. 21A and 21B are flow charts illustrating processes for the tentative composition adjustment and the regular composition adjustment, respectively;

DETAILED DESCRIPTION OF THE PREFERRED EMBODIMENTS

In the following, preferred embodiments of the present invention are described in detail in the following order. In the embodiments, the present invention is applied to an image pickup apparatus or image pickup system which includes a digital still camera and a camera platform.

1. Configuration of the Image Pickup System
   1-1. General Configuration
   1-2. Digital Still Camera
   1-3. Camera Platform
2. Example of the Functional Configuration
3. Composition Process in the Automatic Image Pickup Process
4. Modifications to the Functional Configuration
5. Other Embodiments
6. Program It is to be noted that, while the terms "picture range," "view angle," "image pickup visual field" and "composition" are used in the present specification, they are individually defined in the following manner.

The term "picture range" is a range of a region corresponding to one screen in which, for example, an image looks fitted, and generally has an outer frame shape of a vertically or horizontally elongated rectangle.

The "view angle" is normally called zoom angle or the like and is a representation by an angle of a range included in the picture range which depends upon the position of a zoom lens in an optical system of an image pickup apparatus. Although it is generally considered that the view angle depends upon the focal distance of the image pickup optical system and the size of an image surface, that is, an image sensor or a film, a factor which can vary in response to the focal distance is referred to herein as view angle.

The term "image pickup visual field" represents a visual field by an image pickup optical system. In other words, the image pickup visual field is a range of a peripheral sight of the image pickup apparatus within which the peripheral sight is held as an image pickup object within the picture range. The image pickup visual field depends upon a swinging angle in the pan direction, that is, in the horizontal direction and an angle in the tilt direction, that is, in the vertical direction, or in other words, defined by an elevation angle and a depression angle.

The term "composition" is referred to also as framing and represents an arrangement state of an image pickup object in the picture range, which depends, for example, upon the image pickup visual field, including size settings of the image pickup object.

1. Configuration of the Image Pickup System

1-1. General Configuration

Figure 1A:
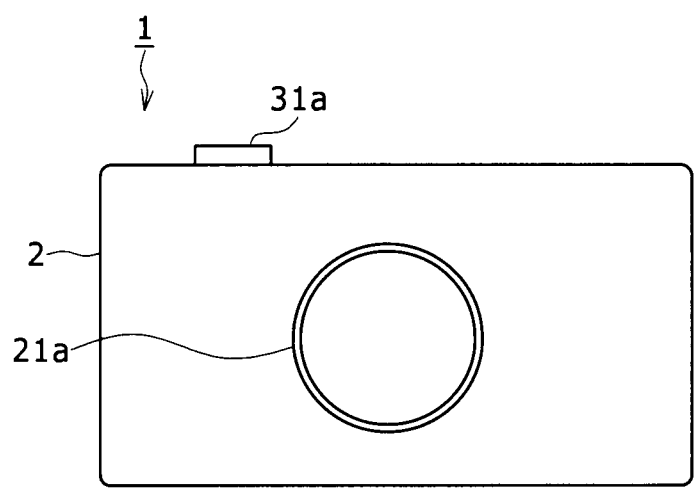
FIGS. 1A and 1B are a front elevational view and a rear elevational view, respectively, of a digital still camera which is a component of an image pickup system to which the present embodiment is applied.
Figure 1B:
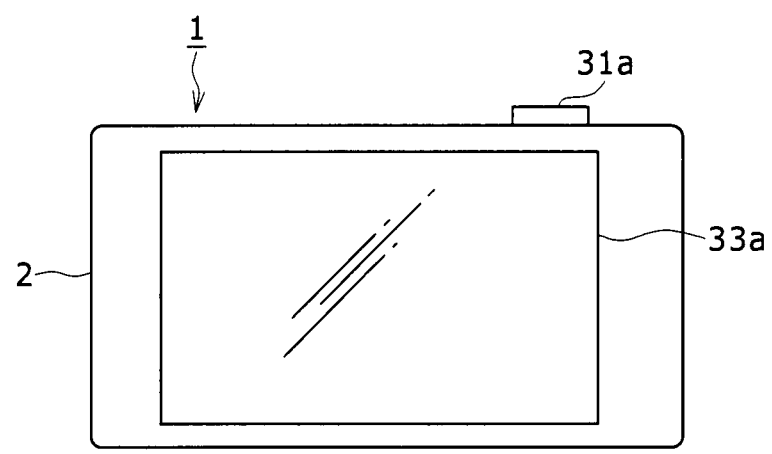

Referring first to FIGS. 1A and 1B, there is shown an image pickup system to which the present invention is applied. The image pickup system includes a digital still camera 1 and a camera platform 10 removably attached to the digital still camera 1.

An appearance of the digital still camera 1 is shown in FIGS. 1A and 1B. Particularly, a front elevation and a rear elevation of the digital still camera 1 are shown in FIGS. 1A and 1B, respectively.

The digital still camera 1 includes a lens section 21a provided on the front side of a main body section 2 as seen in FIG. 1A. The lens section 21a is an element of an optical system for image pickup which is exposed to the outer side of the main body section 2.

A release button 31a is provided on an upper face of the main body section 2. In the image pickup mode, an image picked up by the lens section 21a, that is, a picked up image, is generated as an image signal. In the image pickup mode, picked up image data for each frame are obtained at a predetermined frame rate by an image sensor hereinafter described.

If an operation for the release button 31a is carried out, that is, if a release operation/shutter operation is carried out, then a picked up image, that is, a frame image, at this timing is recorded as image data of a still image into a recording medium. In other words, still image pickup normally called photographing is carried out.

The digital still camera 1 further has a display screen section 33a on the rear face side thereof as shown in FIG. 1B.

In the image pickup mode, an image called through-picture or the like which is an image being currently picked up by the lens section 21a is displayed on the display screen section 33a. The through-picture is a moving picture based on frame images obtained by the image sensor and is an image representing an image pickup object at the time as it is.

On the other hand, in a reproduction mode, image data recorded in the recoding medium are reproduced and displayed.

Further, in response to an operation carried out for the digital still camera 1 by a user, an operation image as a GUI (Graphical User Interface) is displayed on the display screen section 33a.

Further, if a touch panel is combined with the display screen section 33a, then the user can carry out necessary operation by touching the display screen section 33a with a finger thereof.

It is to be noted that, though not shown, the digital still camera 1 may include various operation elements such as keys and dials in addition to the release button 31a.

Figure 3:
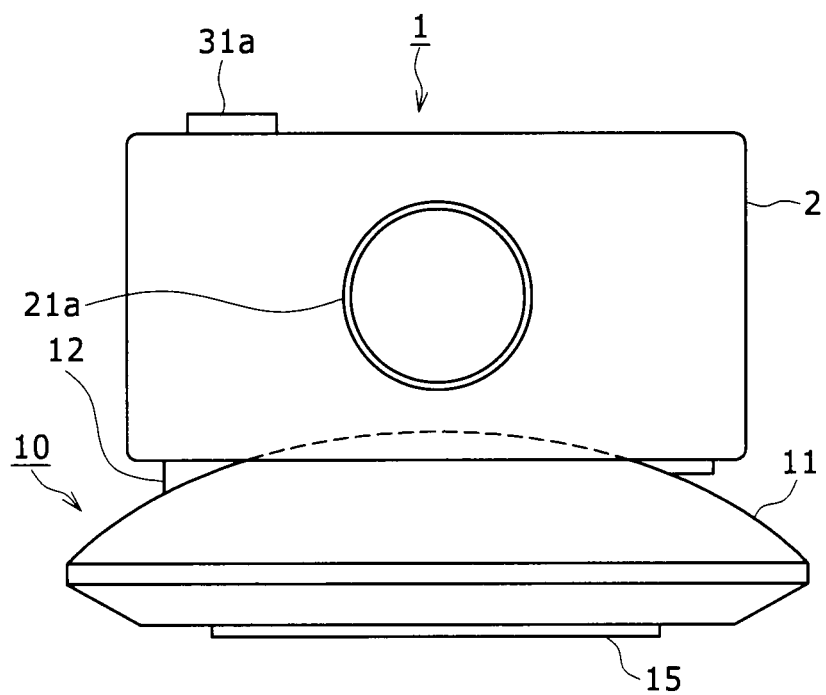
FIG. 3 is a front elevational view showing the digital still camera attached to the camera platform.
Figure 4:
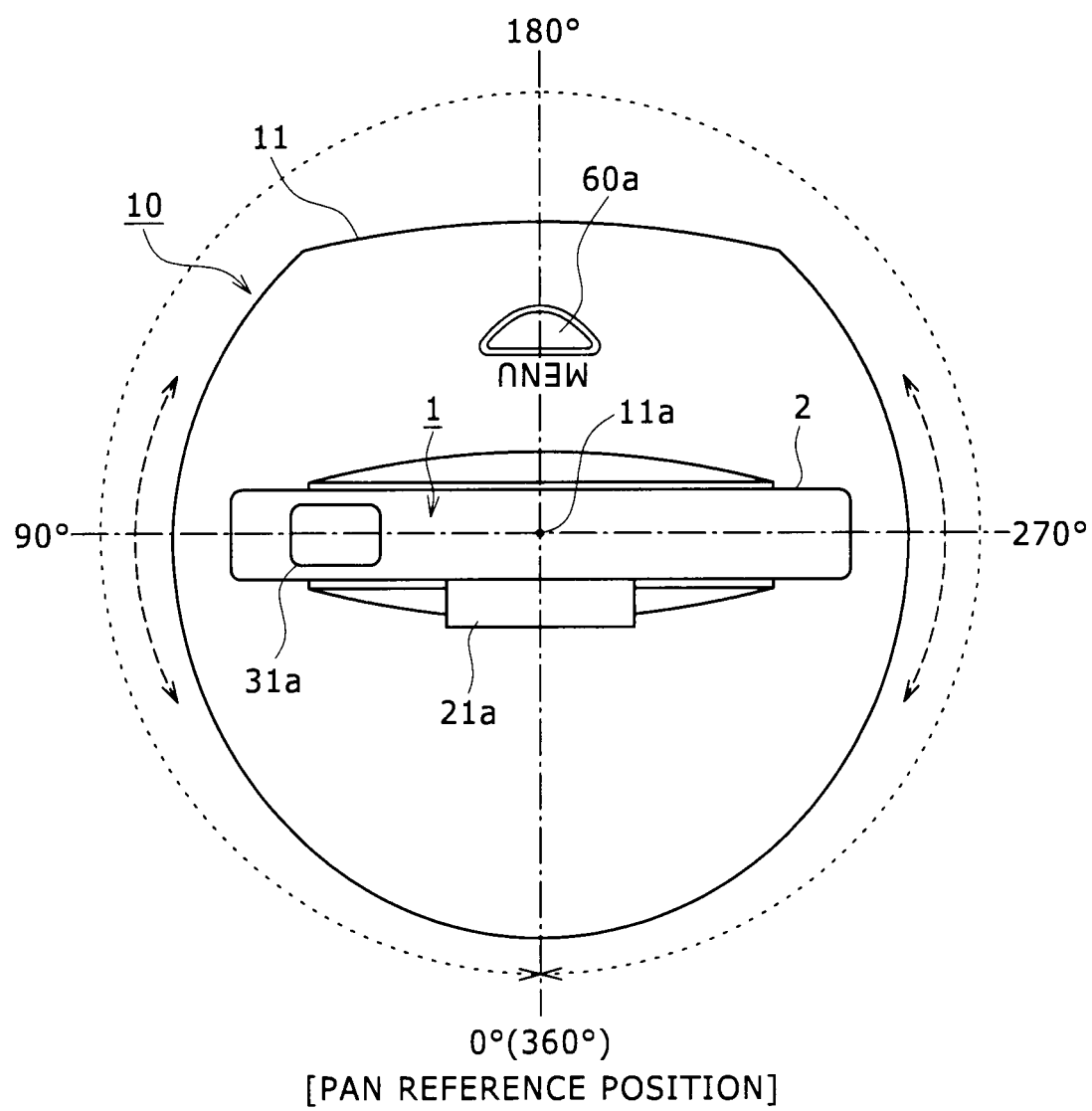
FIG. 4 is a schematic top plan view illustrating a movement in the pan direction in the state in which the digital still camera is attached to the camera platform.
Figure 5A:
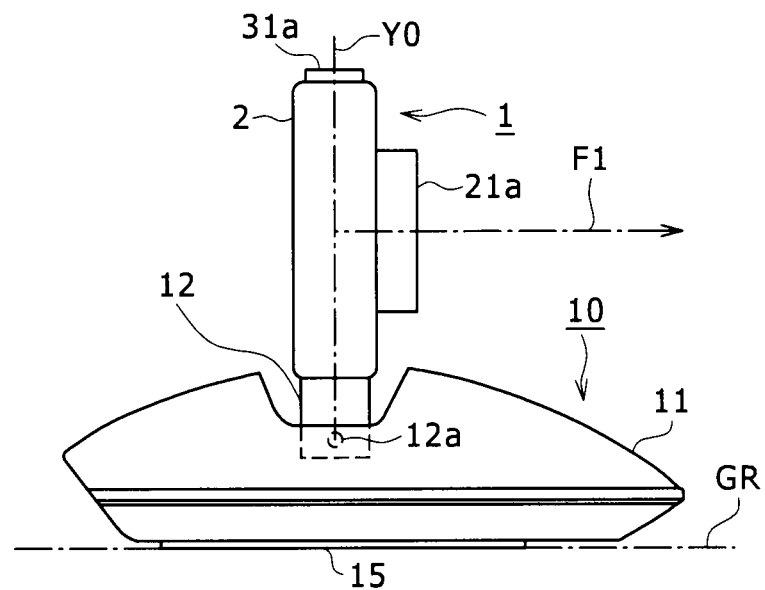
FIGS. 5A and 5B are side elevational views illustrating a movement in the tilt direction in the state in which the digital still camera is attached to the camera platform.
Figure 5B:
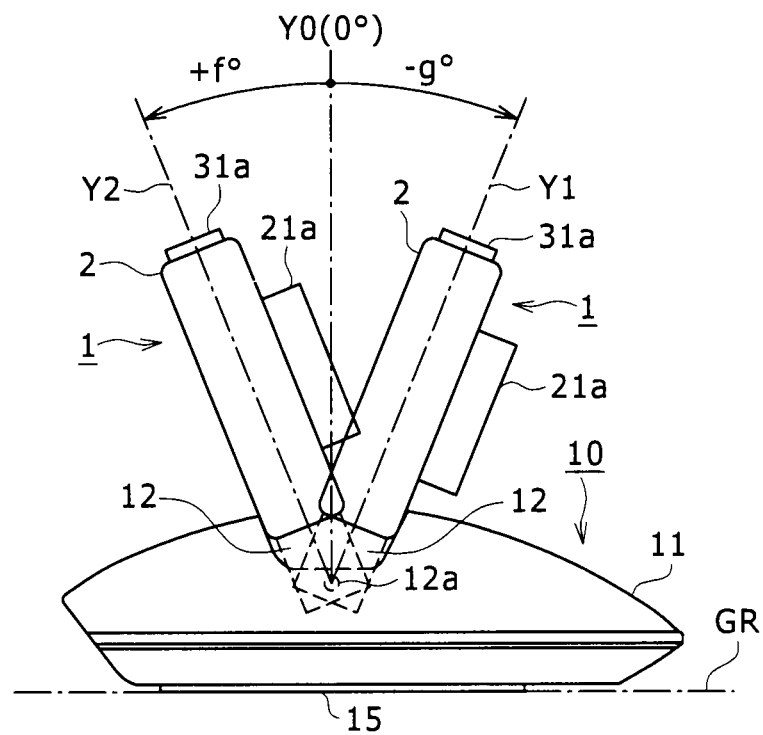

FIG. 2 shows an appearance of the camera platform 10. Further, FIGS. 3 to 5B show, as an appearance of the image pickup system, the digital still camera 1 placed in an appropriate state on the camera platform 10. FIG. 3 shows a front elevational view, FIG. 4 shows a top plan view, and FIGS. 5A and 5B show side elevational views, particularly, FIG. 5B illustrates a range of movement of the digital still camera 1 by a tilt mechanism hereinafter described.

Referring to FIGS. 2 to 5B, the camera platform 10 is roughly structured such that a main body portion 11 is combined with and provided on a ground stand portion 15 and a camera pedestal portion 12 is attached to the main body portion 11.

In order to attach the digital still camera 1 to the camera platform 10, the digital still camera 1 is placed at the bottom face side thereof on the upper face side of the camera pedestal portion 12.

Referring particularly to FIG. 2, a projection 13 and a connector 14 are provided on the upper face of the camera pedestal portion 12. Though not shown, a hole for engaging with the projection 13 is formed on the lower face of the main body section 2 of the digital still camera 1. In a state wherein the digital still camera 1 is placed appropriately on the camera pedestal portion 12, the hole and the projection 13 are engaged with each other. In this state, when ordinary pan and tilt movements of the camera platform 10 are carried out, such a situation that the digital still camera 1 is displaced on or removed from the camera platform 10 does not occur.

Further, in the digital still camera 1, a connector is provided also at a predetermined position of the lower face thereof. In the state in which the digital still camera 1 is attached appropriately to the camera pedestal portion 12 as described above, the connector of the digital still camera 1 and the connector 14 of the camera platform 10 are connected to each other thereby to allow communication at least between the digital still camera 1 and the camera platform 10.

It is to be noted that, for example, the connector 14 and the projection 13 actually can change or move the positions thereof within a certain range on the camera pedestal portion 12. For example, if an adapter compatible with the shape of the bottom face of the digital still camera 1 or a like element is used additionally, then different types of digital still cameras can be attached to the camera pedestal portion 12 for communication with the camera platform 10.

Now, basic movements of the digital still camera 1 in pan and tilt directions by the camera platform 10 are described.

First, basic movements of the digital still camera 1 in the pan direction are described.

In a state in which the camera platform 10 is placed, for example, on a table or on the floor, the bottom face of the ground stand portion 15 contacts with the table or the floor. In this state, the main body portion 11 side can rotate in the clockwise direction and the counterclockwise direction around a rotation axis 11a as seen in FIG. 4. Consequently, the image pickup visual field in the horizontal direction, that is, in the leftward and rightward direction, of the digital still camera 1 attached to the camera platform 10 can be carried out thereby. In other words, panning can be carried out.

It is to be noted that the pan mechanism of the camera platform 10 in this instance is structured such that rotation by more than 360° can be carried out freely without any limitation with regard to both of the clockwise direction and the counterclockwise direction.

Further, the pan mechanism of the camera platform 10 has a reference position determined with regard to the pan direction.

It is assumed here that the pan reference position is represented by 0° or 360° and the rotational position of the main body portion 11 along the pan direction, that is, the pan position or pan angle, is represented by 0° to 360°.

Basic movements of the camera platform 10 in the tilt direction are carried out in the following manner.

A movement of the camera platform 10 in the tilt direction is obtained by swinging the angular position of the camera pedestal portion 12 in the opposite directions to an elevation angle and a depression angle around a pivot axis 12a as seen in FIGS. 5A and 5B.

FIG. 5A particularly shows the camera pedestal portion 12 at a tilt reference position Y0 which is 0°. In this state, an image pickup direction F1 which coincides with an image pickup optical axis of the lens section 21a of the optical system section and a ground face portion GR with which the ground stand portion 15 contacts extend in parallel to each other.

From this state, the camera pedestal portion 12 can move, toward the elevation angle direction, within a range of a predetermined maximum rotational angle +f° from the tilt reference position Y0 of 0° around the pivot axis 12a as seen in FIG. 5B. On the other hand, also toward the depression angle direction, the camera pedestal portion 12 can move within a range of a predetermined maximum rotational angle −g° from the tilt reference position Y0 of 0°.

Since the camera pedestal portion 12 moves within the range from the maximum rotational angle +f° to the maximum rotational angle −g° with reference to the tilt reference position Y0 of 0° in this manner, the image pickup visual field in the tilt direction, that is, in the upward and downward direction, of the digital still camera 1 attached to the camera platform 10, that is, to the camera pedestal portion 12, can be varied. In other words, a tilt movement is obtained.

Figure 6:
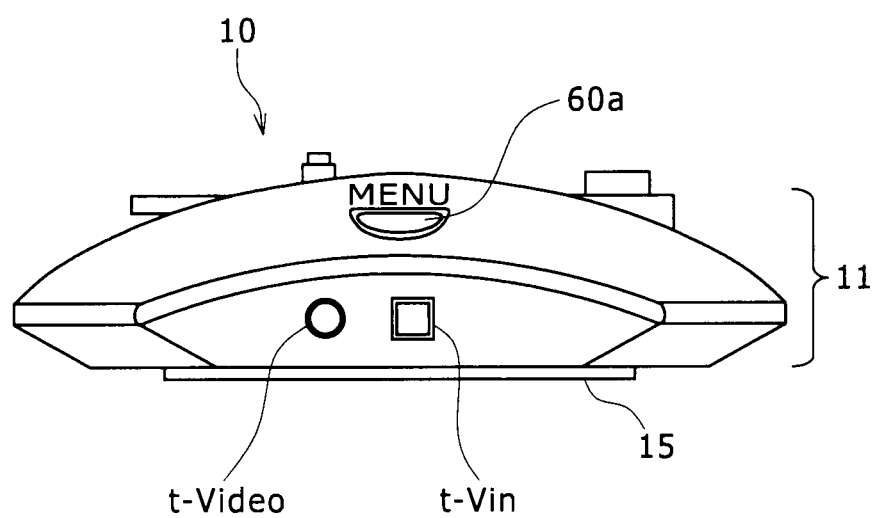
FIG. 6 is a rear elevational view of the camera platform.

FIG. 6 shows a rear face of the camera platform 10.

Referring to FIG. 6, the camera platform 10 has a power supply terminal section t-Vin and a video terminal section t-Video formed on a rear face of the main body portion 11 thereof. To the power supply terminal section t-Vin, a power supply cable is removably connected, and to the video terminal section t-Video, a video cable is removably connected.

The camera platform 10 supplies electric power input thereto through the power supply terminal section t-Vin to the digital still camera 1 attached to the camera pedestal section 12 described hereinabove to charge the digital still camera 1.

In short, the camera platform 10 functions also as a cradle or dock for charging the digital still camera 1.

Further, the camera platform 10 is configured such that, when an image signal, for example, based on a picked up image is transmitted from the digital still camera 1 side, the camera platform 10 outputs the image signal to the outside through the video terminal section t-Video.

Further, as shown also in FIG. 6 and FIG. 4, a menu button 60a is provided on the rear face of the main body portion 11 of the camera platform 10. If the menu button 60a is operated, then a menu screen image is displayed, for example, on the display screen section 33a side of the digital still camera 1 through communication between the camera platform 10 and the digital still camera 1. Through the menu screen image, the user can carry out demanded operation.

Further, though not shown, the camera platform 10 may additionally include a sound inputting section having a microphone and a sound inputting circuit system like a sound inputting section 62 hereinafter described.

Further, the camera platform 10 may include an image pickup section including an image pickup lens, an image sensor, a picked up image signal processing system and so forth like an image pickup section 63 hereinafter described.

1-2. Digital Still Camera

Figure 7:
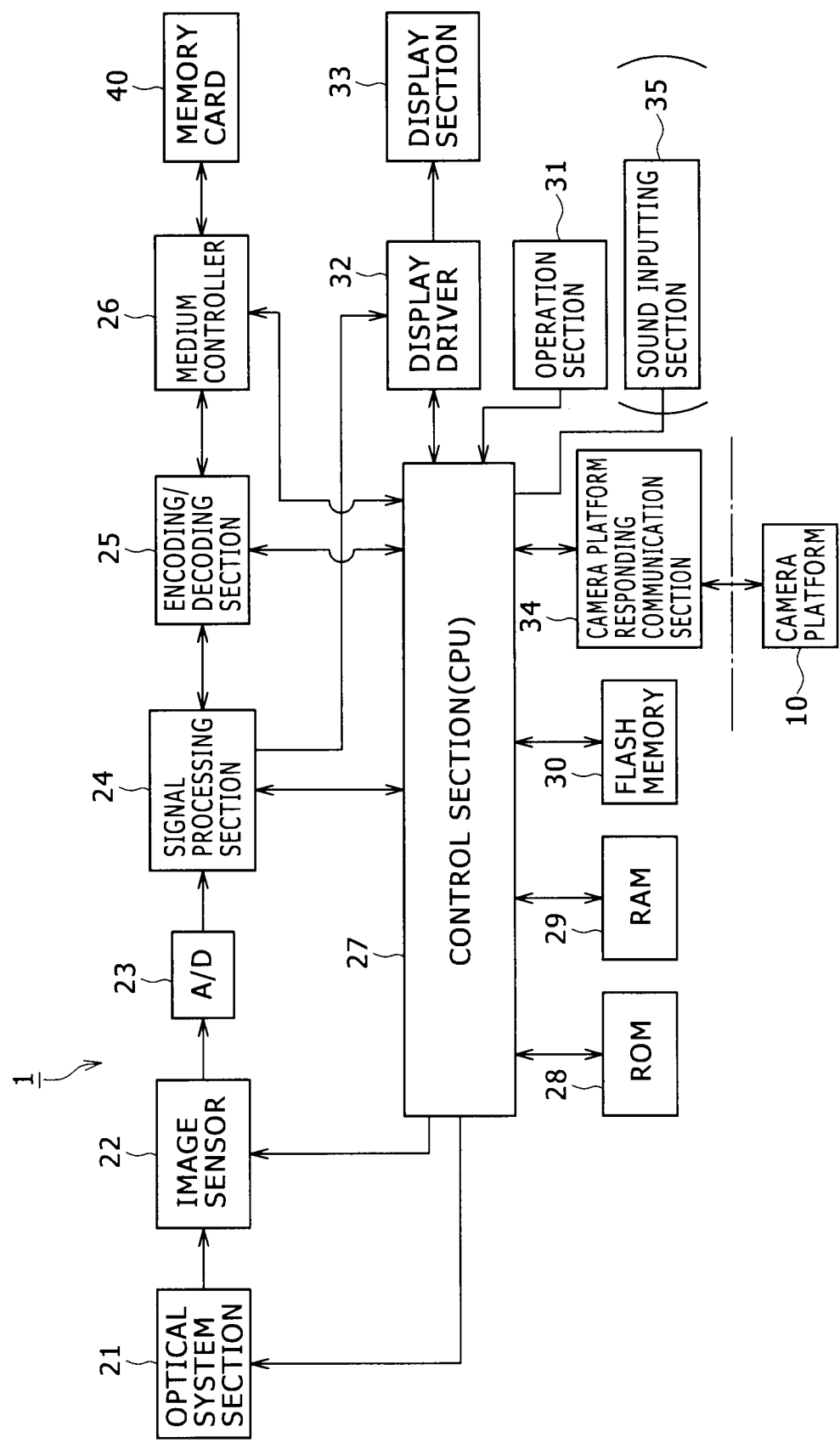
FIG. 7 is a block diagram showing an example of an internal configuration of the digital still camera.

FIG. 7 shows an example of an internal configuration of the digital still camera 1.

Referring to FIG. 7, an optical system section 21 includes a predetermined number of lens groups for image pickup including, for example, a zoom lens and a focusing lens, a diaphragm and so forth. The optical system section 21 forms an image of light incident thereto as image pickup light on a light receiving face of an image sensor 22.

The optical system section 21 further includes driving mechanical units for driving the zoom lens, focusing lens and diaphragm described above and associated elements. Operation of the driving mechanical units is controlled by camera control such as zoom or view angle control, automatic focusing control and automatic exposure control which are executed, for example, by a control section 27.

The image sensor 22 carries out photoelectric conversion of converting image pickup light obtained by the optical system section 21 into an electric signal. To this end, the image sensor 22 receives the image pickup light from the optical system section 21 by means of the light receiving face of a photoelectric conversion element and successively outputs signal charge accumulated in response to the intensity of the received light at predetermined timings. Consequently, an electric signal corresponding to the image pickup light, that is, a picked up image signal, is output.

It is to be noted that, although the photoelectric conversion element or image pickup element adopted as the image sensor 22 is not limited particularly, under the existing circumstances, for example, CMOS (Complementary Metal Oxide Semiconductor) sensors, CCD (Charge Coupled Device) sensors and like sensors are available. Where a CMOS sensor is adopted, a device or part which corresponds to the image sensor 22 may be structured including an analog-digital converter which corresponds to an A/D converter 23 described below.

The picked up image signal output from the image sensor 22 is input to the A/D converter 23, by which it is converted into a digital signal. The digital signal is input to a signal processing section 24.

The signal processing section 24 is configured, for example, from a DSP (Digital Signal Processor) and carries out predetermined signal processing in accordance with a program for the digital picked up image signal output from the A/D converter 23.

The signal processing section 24 fetches the digital picked up image signal output from the A/D converter 23 in a unit corresponding to one still picture, that is, one frame image. Then, the signal processing section 24 carries out predetermined signal processing for the picked up image signal fetched in a unit of a still picture to generate picked up image data or picked up still image data which are image signal data corresponding to one still picture.

Further, the signal processing section 24 sometimes utilizes the picked up image data acquired in this manner to execute an image analysis process for an image pickup object detection process or a composition process hereinafter described.

In order to record the picked up image data generated by the signal processing section 24 in such a manner as described above as image information into a memory card 40 as a recording medium, the picked up image data corresponding, for example, to one still picture are output from the signal processing section 24 to an encoding/decoding section 25.

The encoding/decoding section 25 executes, for the picked up image data in a unit of a still picture output from the signal processing section 24, compression encoding in accordance with a predetermined still picture compression encoding method and then adds a header and so forth to the resulting picked up image data, for example, under the control of a control section 27 to convert the picked up image data into image data of a predetermined compressed form. Then, the image data produced in this manner are transferred to a medium controller 26.

The medium controller 26 writes and records the image data transferred thereto into the memory card 40 under the control of the control section 27. The memory card 40 in this instance is a recording medium configured such that it has an outer profile of a card type formed, for example, in compliance with predetermined standards and internally has a non-volatile semiconductor storage device such as a flash memory.

It is to be noted that the recording medium for recording image data may be different in type, form and so forth from the memory card described above. It is possible to adopt various recording media such as, for example, an optical disk, a hard disk, a semiconductor memory chip such as a flash memory chip attached against removal, and a hologram memory.

Further, the digital still camera 1 may be configured such that a display section 33 executes image display making use of picked up image data obtained by the signal processing section 24 to display a through-picture which is an image which is being currently picked up.

For example, while the signal processing section 24 fetches a picked up image signal output from the A/D converter 23 to generate picked up image signal corresponding to a single still picture as described hereinabove, it successively carries out the operation to successively generate picked up image data corresponding to frame images of a dynamic picture. Then, the picked up image data generated successively in this manner are transferred to a display driver 32 under the control of the control section 27.

The display driver 32 generates a driving signal for driving the display section 33 based on the picked up image data input thereto from the signal processing section 24 as described above and outputs the driving signal to the display section 33. Consequently, the display section 33 successively displays images based on the picked up image data in a unit of a still picture.

If user see this, the image that is picked up is at the time is displayed on the display section 33 in a moving image. That is, a through-picture is displayed.

Further, the digital still camera 1 can reproduce image data recorded in the memory card 40 and causes the display section 33 to display an image of the image data.

To this end, the control section 27 designates image data and issues an instruction to the medium controller 26 to read out data from the memory card 40. In accordance with the instruction, the medium controller 26 accesses an address on the memory card 40 on which the designated image data are recorded to execute data reading and transfers the read out data to the encoding/decoding section 25.

The encoding/decoding section 25 extracts entity data as compressed still picture data from within the picked up image data transferred thereto from the medium controller 26, for example, under the control of the control section 27 and then executes a decoding process corresponding to the compression coding for the compressed still picture data to obtain picked up image data corresponding to one still picture. Then, the encoding/decoding section 25 transfers the picked up image data to the display driver 32. Consequently, an image of the picked up image data recorded on the memory card 40 is reproduced and displayed on the display section 33.

The display section 33 can display not only such a through-picture of a reproduced image of image data but also a user interface image or operation image.

In this instance, the control section 27 generates displaying image data as a necessary user interface image, for example, in response to an operation state then and outputs the generated displaying image data to the display driver 32. Consequently, a user interface image is displayed on the display section 33.

It is to be noted that the user interface image can be displayed on a display screen of the display section 33 separately from a monitor image or a reproduction image of picked up image data, for example, like a particular menu screen image, or can be displayed in a superposed or combined image at part of the monitor screen or the reproduction image of picked up image data.

The control section 27 includes a CPU (Central Processing Unit) and configures a microcomputer together with a ROM 28, a RAM 29 and so forth.

The ROM 28 stores, for example, programs to be executed by the CPU as the control section 27 and various kinds of setting information relating to operation of the digital still camera 1.

The RAM 29 serves as a main storage device for the CPU.

Further, a flash memory 30 in this instance is provided as a nonvolatile storage area to be used to store various kinds of setting information whose alteration or rewriting is demanded, for example, in response to a user operation or an operation history.

It is to be noted that, where a nonvolatile memory such as, for example, a flash memory is adopted as the ROM 28, a partial storage area of the ROM 28 may be used in place of the flash memory 30.

In the digital still camera 1, the control section 27 carries out various image pickup preparation processes for automatic image pickup.

First, the control section 27 executes, or controls the signal processing section 24 to execute, as an image pickup object detection process, a process of executing image pickup object detection from frame images obtained by the signal processing section 24 while the image pickup visual field is varied and then searching for an image pickup object around the digital still camera 1.

Further, as a composition process, the control section 27 carries out optimum composition decision of deciding a composition, which is considered optimum in response to a mode of the image pickup object detected by the image pickup object detection and composition comparison using the composition determined optimum by the optimum composition determination as a target composition.

After such image pickup preparation processes, the control section 27 carries out control and processing for executing automatic recording of a picked up image.

Such control processes are hereinafter described.

An operation section 31 includes various operation elements provided on the digital still camera 1 and operation information signal outputting elements for generating operation information signals responsive to operation carried out for the operation elements and outputting the operation information signals to the control section 27.

The operation elements include the release button 31a and a power supply button, a mode button, a zoom operation button, an operation dial and so forth whose illustration is omitted in FIG. 1.

Where the display section 33 is formed as a touch panel, also the touch sensor section of the display section 33 is included in the operation section 31.

Also a reception section for receiving a command signal from a remote controller may be included in the operation section 31.

The control section 27 executes predetermined processing in response to an operation information signal input thereto from the operation section 31. Consequently, operation of the digital still camera 1 in accordance with the user operation is executed.

A camera platform responding communication section 34 executes communication between the camera platform 10 side and the digital still camera 1 side in accordance with a predetermined communication method.

The camera platform responding communication section 34 has a physical layer configuration for allowing transmission and reception of a communication signal with a communication section on the camera platform 10 side, for example, in a state wherein the digital still camera 1 is attached to the camera platform 10 and a configuration for implementing a communication process corresponding to a predetermined layer which is an upper layer with respect to the physical layer. As the physical layer configuration, the connector to be connected to the connector 14 in FIG. 2 is included.

Further, in order to make charging from the camera platform 10 side possible, each of the connectors mentioned includes not only terminals for transferring a communication signal but also terminals for transmission of charging power. Though not shown, the digital still camera 1 includes a battery receiving section for removably receiving a battery, and a battery received in the battery receiving section is charged based on electric power sent from the camera platform 10 side.

The digital still camera 1 sometimes includes a sound inputting section 35. The sound inputting section 35 is used as decision of a release timing to detect an input of, for example, voice of a particular word or of particular sound such as, for example, sound by clapping of hands as a trigger input to a request responding image pickup mode hereinafter described.

The sound inputting section 35 includes a sound signal processing circuit including a microphone and a microphone amplifier, a sound analysis section for deciding particular sound, and so forth. It is to be noted that sound analysis may otherwise be executed by the control section 27.

Also where an input of voice of a particular word or of particular sound is to be decided for decision of a shutter release timing, the sound inputting section 35 is provided.

1-3. Camera Platform

Figure 8:
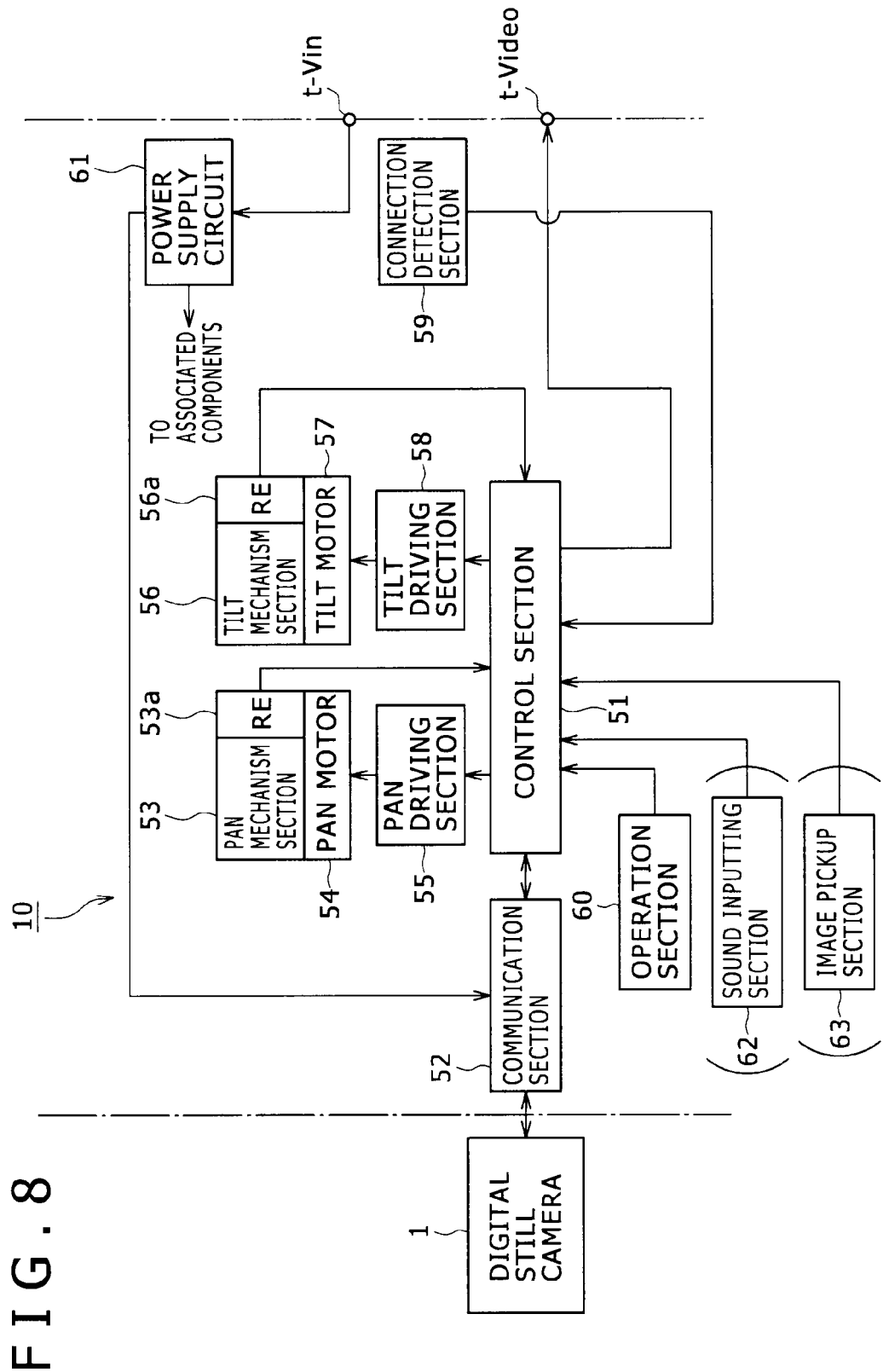
FIG. 8 is a block diagram showing an example of an internal configuration of the camera platform.

FIG. 8 shows an example of an internal configuration of the camera platform 10.

Referring to FIG. 8, the camera platform 10 includes a power supply terminal section t-Vin and a video terminal section t-Video as described hereinabove with reference to FIG. 6.

Electric power input through the power supply terminal section t-Vin is supplied as operation power necessary for the components of the camera platform 10 through a power supply circuit 61. The power supply circuit 61 further generates charging electric power for the digital still camera 1 and supplies the charging electric power to the digital still camera 1 side through a communication section 52 and associated connectors.

Meanwhile, to the video terminal section t-Video, an image signal transmitted from the digital still camera 1 side is supplied through the communication section 52 and a control section 51.

It is to be noted that, while it is described above that the operation electric power for the components of the camera platform 10 is supplied only through the power supply terminal section t-Vin, actually the camera platform 10 has a receiving section for a cell such that operation electric power for the components can be supplied from a cell received in the receiving section.

The camera platform 10 further includes a connection detection section 59 for detecting whether or not a cable is connected to each of the power supply terminal section t-Vin and the video terminal section t-Video. As a particular configuration of the detection mechanism for cable connection, for example, a switch may be used for on/off switching by connection/disconnection of a cable. However, the connection detection section 59 may have any configuration only if it outputs a detection signal for identification of connection/disconnection of a cable, and the particular configuration of the same is not limited particularly.

A detection signal of the connection detection section 59 is supplied to the control section 51. More particularly, a detection signal regarding the power supply terminal section t-Vin and a detection signal regarding the video terminal section t-Video are supplied to the control section 51.

Further, as described hereinabove, the camera platform 10 includes a pan-tilt mechanism. More particularly, as the pan-tilt mechanism, the camera platform 10 includes a pan mechanism section 53, a pan motor 54, a tilt mechanism section 56 and a tilt motor 57 as shown in FIG. 8.

The pan mechanism section 53 is configured including a mechanism for providing a movement in the pan direction illustrated in FIG. 4, that is, in the horizontal direction or leftward or rightward direction to the digital still camera 1 attached to the camera platform 10. The movement of the mechanism is obtained by rotation of the pan motor 54 in the forward direction or the reverse direction.

Similarly, the tilt mechanism section 56 is configured including a mechanism for providing a movement in the tilt direction illustrated in FIGS. 5A and 5B, that is, in the vertical direction or upward or downward direction to the digital still camera 1 attached to the camera platform 10. The movement of the mechanism is obtained by rotation of the tilt motor 57 in the forward direction or the reverse direction.

The control section 51 is configured, for example, as a microcomputer formed from a combination of a CPU, a ROM, a RAM and so forth and controls the movement of the pan mechanism section 53 and the tilt mechanism section 56.

For example, when the control section 51 is to control the movement of the pan mechanism section 53, it outputs a signal indicative of a direction of the movement and a moving speed to the pan driving section 55. The pan driving section 55 generates a motor driving signal corresponding to the signal input thereto and outputs the motor driving signal to the pan motor 54. If the pan motor 54 is, for example, a stepping motor, then the motor driving signal is a pulse signal for PWM control.

In response to the motor driving signal, the pan motor 54 rotates, for example, at a demanded speed in a demanded direction. As a result, also the pan mechanism section 53 is driven to move at a corresponding speed in a corresponding direction.

Similarly, when the control section 51 is to control the movement of the tilt mechanism section 56, it outputs a signal indicative of a moving direction and a moving speed necessary for the tilt mechanism section 56 to a tilt driving section 58. The tilt driving section 58 generates and outputs a motor driving signal corresponding to the signal input thereto to the tilt motor 57. In response to the motor driving signal, the tilt motor 57 rotates, for example, at a demanded speed in a demanded direction, and consequently, also the tilt mechanism section 56 is driven to move at a corresponding speed in a corresponding speed.

The pan mechanism section 53 includes a rotary encoder or rotation detector 53a. The rotary encoder 53a outputs, in response to a rotational movement of the pan mechanism section 53, a detection signal representative of an angle of the rotation to the control section 51. Meanwhile, the tilt mechanism section 56 includes a rotary encoder 56a. Also the rotary encoder 56a outputs, in response to rotational movement of the tilt mechanism section 56, a detection signal representative of an angle of the rotation to the control section 51.

Consequently, the control section 51 can acquire or monitor information of the rotational angular amounts of the pan mechanism section 53 and the tilt mechanism section 56 being driven on the real time basis.

The communication section 52 executes communication with the camera platform responding communication section 34 in the digital still camera 1 attached to the camera platform 10 in accordance with a predetermined communication method.

The communication section 52 has a physical layer configuration for allowing transmission and reception of a communication signal with an opposite side communication section by wireless or wired communication and a configuration for implementing a communication process corresponding to a predetermined layer which is an upper layer with respect to the physical layer similarly to the camera platform responding communication section 34. As the physical layer configuration, the connector 14 of the camera pedestal portion 12 in FIG. 2 is included.

An operation section 60 includes an operation element as the menu button 60a shown in FIG. 4 or 6, and an operation information signal outputting block for generating an operation information signal corresponding to an operation carried out for the operation element and outputting the operation information signal to the control section 51. The control section 51 executes a predetermined process in response to the operation information signal input thereto from the operation section 60.

Further, where a remote controller is prepared for the camera platform 10, also a reception section for a command signal from the remote controller is included in the operation section 60.

The camera platform 10 may include a sound inputting section 62. This is a case in which, as decision of a release timing, an input of voice of a particular word or particular sound such as sound of clapping of hands is determined on the camera platform 10 side.

The sound inputting section 62 includes a sound signal processing circuit including a microphone and a microphone amplifier, a sound analysis section for deciding particular sound and so forth. It is to be noted that the sound analysis may otherwise be executed by the control section 51.

Further, the camera platform 10 may include an image pickup section 63. The image pickup section 63 is provided in order to detect a particular image pickup object state such as, for example, a particular pose, the eyes or the like of a user on the image pickup side for the decision of a release timing.

The image pickup section 63 includes an optical system section, an image sensor, an A/D converter, a signal processing section, an image analysis section and so forth. It is to be noted that the image analysis may otherwise be executed by the control section 51.

2. Example of the Functional Configuration

Figure 9:
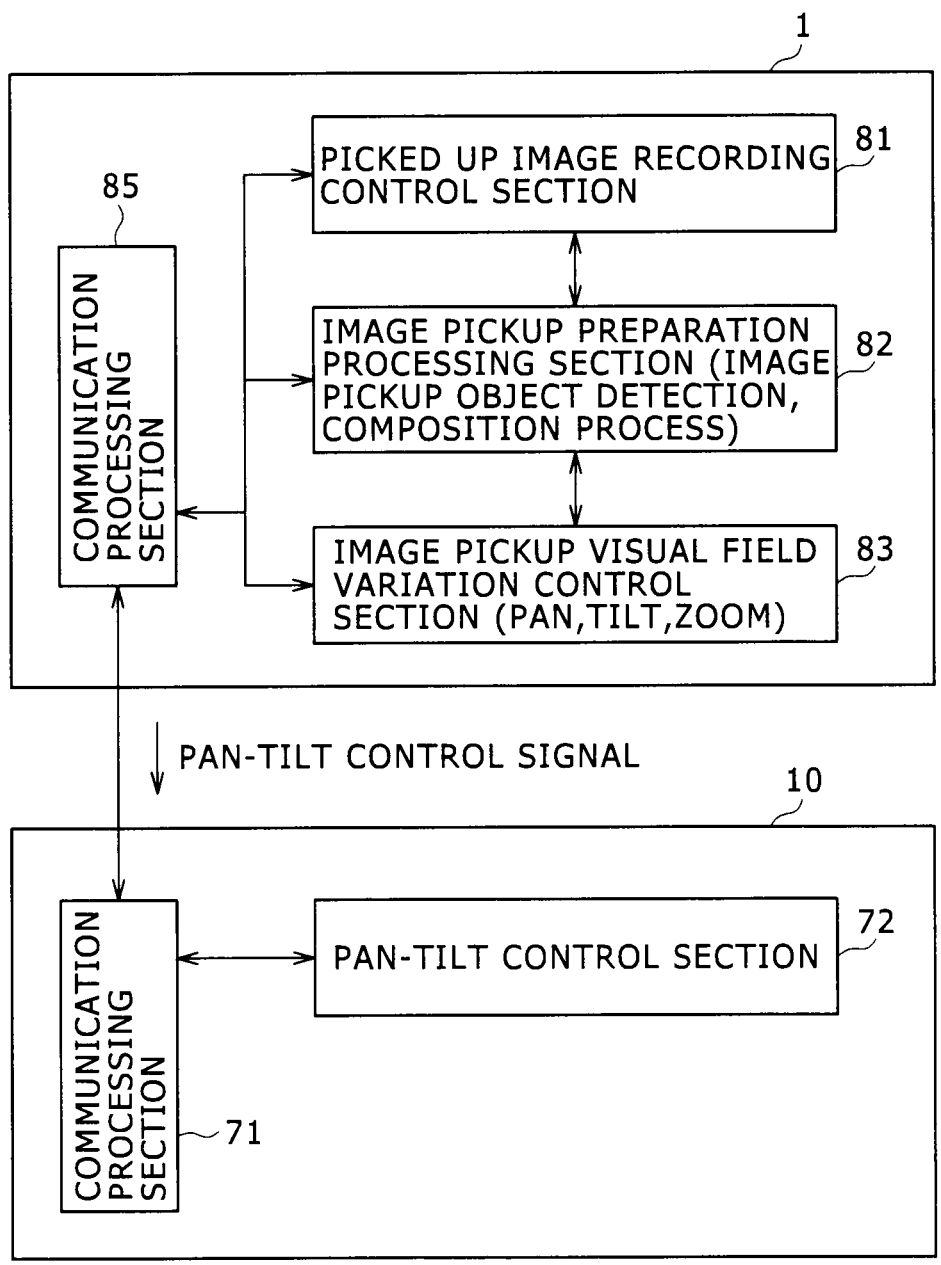
FIG. 9 is a block diagram showing a configuration of control functions of the digital still camera and the camera platform.

Now, an example of a functional configuration implemented by hardware and software (program) regarding the digital still camera 1 and the camera platform 10 which configure the image pickup system is described in FIG. 9.

The present functional configuration example is configured so as to implement an image pickup control apparatus for carrying out image pickup operation control of the image pickup system. The functional configuration example includes hardware configurations principally including the control section 27 of the digital still camera 1, the control section 51 of the camera platform 10 and so forth, and controlling processing functions formed by association of software modules started by the hardware configurations. In FIG. 9, control functions necessary for a composition process for the present embodiment are individually shown as blocks.

It is to be noted that, although variable functional configuration examples are possible, FIG. 9 shows an example while another example is hereinafter described with reference to FIG. 22.

Referring to FIG. 9, the digital still camera 1, particularly the control section 27, includes an picked up image recording control section 81, an image pickup preparation processing section 82, an image pickup visual field variation control section 83 and a communication processing section 85.

Meanwhile, the camera platform 10, particularly the control section 51, includes, for example, a communication processing section 71 and a pan-tilt control section 72.

First, on the digital still camera 1 side, the picked up image recording control section 81 acquires an image obtained by image pickup as data of an image signal, that is, as picked up image data, and executes a control process for storing the picked up image data into a recording medium. The picked up image recording control section 81 carries out control also for reproduction or displaying operation of the recorded still picture data, for displaying operation of a through-picture upon image pickup and so forth.

The picked up image recording control section 81 carries out control of the optical system section 21, image sensor 22, A/D converter 23, signal processing section 24, encoding/decoding section 25, medium controller 26, display driver 32 and so forth of FIG. 7. In other words, the picked up image recording control section 81 controls basic operation of the digital still camera 1 by issuing instructions for lens driving control of the optical system section 21, image pickup operation of the image sensor 22, image signal processing, recording and reproduction processing and so forth so that still picture image pickup and so forth are executed.

The image pickup preparation processing section 82 carries out an image pickup preparation process when automatic image pickup of a still picture which does not rely upon a release operation of a user is to be executed.

The image pickup preparation process includes an image pickup object detection process. In the image pickup object detection process, while the camera platform 10 executes pan and tilt movements, frame images obtained by the signal processing section 24 are successively confirmed and processed so that an image pickup object such as, for example, the face of a person may be included in the image pickup visual field. To this end, the image pickup preparation processing section 82 carries out such processes as decision of necessary pan and tilt movements of the camera platform 10, person detection by image analysis of frame image data, face detection and so forth.

The image pickup preparation process further includes a composition process. In the composition process, it is decided whether or not the arrangement of an image pickup object image in the image pickup visual field is in an optimum state (composition decision), and then the composition is adjusted (composition adjustment). For this adjustment of the composition, the image pickup preparation processing section 82 carries out decision of necessary panning and tilt movements of the camera platform 10, decision of zoom lens driving of the optical system section 21 and so forth.

It is to be noted that the processing function of carrying out image analysis for the image pickup object detection process and the composition process may be executed not by the control section 27 but by a DSP (Digital Signal Processor) serving as the signal processing section 24. Accordingly, the processing section as the image pickup preparation processing section 82 can be implemented by a program and instructions to be provided to one or both of the control section 27 and the DSP as the signal processing section 24.

The image pickup visual field variation control section 83 controls operation of actually varying the image pickup visual field. The variation of the image pickup visual field is carried out by pan-tilt movements of the camera platform 10 or by zoom operation of the optical system section 21. Accordingly, the image pickup visual field variation control section 83 is a functional block of carrying out pan-tilt control and/or zoom control.

Where a cameraman uses the digital still camera 1 to manually carry out image pickup, the image pickup visual field variation control section 83 controls zoom lens driving, for example, in response to a zoom operation of the cameraman.

In the automatic image pickup mode, where automatic still picture image pickup is to be carried out, the image pickup visual field variation control section 83 carries out zoom driving control, pan driving control and tilt driving control in accordance with a decision or an instruction of the image pickup preparation processing section 82. For the pan driving control and the tilt driving control, a pan-tilt control signal is transmitted from the image pickup visual field variation control section 83 to the camera platform 10 side through the communication processing section 85.

Particularly upon execution of composition adjustment or the like, the image pickup visual field variation control section 83 outputs, in response to pan-tilt movement amounts decided by the image pickup preparation processing section 82, a pan-tilt control signal instructive of the movement amounts to the camera platform 10.

Further, the image pickup visual field variation control section 83 drives and controls the zoom movement of the optical system section 21 in response to a zoom magnification decided by the image pickup preparation processing section 82.

The communication processing section 85 executes communication in accordance with a predetermined communication protocol with the communication processing section 71 provided on the camera platform 10 side.

The pan-tilt control signal generated by the image pickup visual field variation control section 83 is transmitted to the communication processing section 71 of the camera platform 10 by communication of the communication processing section 85.

Further, on the camera platform 10 side, the communication processing section 71 executes communication with the communication processing section 85 on the digital still camera 1 side.

Where the pan-tilt control signal described hereinabove is received, the communication processing section 71 outputs the pan-tilt control signal to the pan-tilt control section 72.

The pan-tilt control section 72 executes processing regarding pan-tilt control from among the control processes executed by the control section 51 on the camera platform 10 side, for example, shown in FIG. 8.

The pan-tilt control section 72 controls the pan driving section 55 and the tilt driving section 58 shown in FIG. 8 in accordance with the pan-tile control signal input thereto. Consequently, pan and tilt movements, for example, for an image pickup object detection process or panning, tilting and so forth for obtaining an optimum horizontal view angle and an optimum vertical view angle by the composition process are carried out.

3. Composition Process in the Automatic Image Pickup Process

The present embodiment is the composition process upon automatic still picture image pickup which does not involve a release operation of the user.

First, a procedure of an automatic still picture image pickup process is described with reference to FIG. 10.

In a mode in which automatic still picture image pickup is carried out (the mode is hereinafter referred to as automatic still picture image pickup mode), the image pickup system of the present embodiment carries out operation for image pickup object detection or search, optimum composition decision and composition combination as preparations for image pickup to carry out automatic composition adjustment operation wherein a composition decided to be optimum by decision in response to a mode of an image pickup object detected by the image pickup object detection is determined as a target composition. Then, the release processing is automatically carried out at the predetermined condition. Consequently, appropriate still picture image pickup is carried out while eliminating the necessity for an operation of a cameraman.

Figure 10:
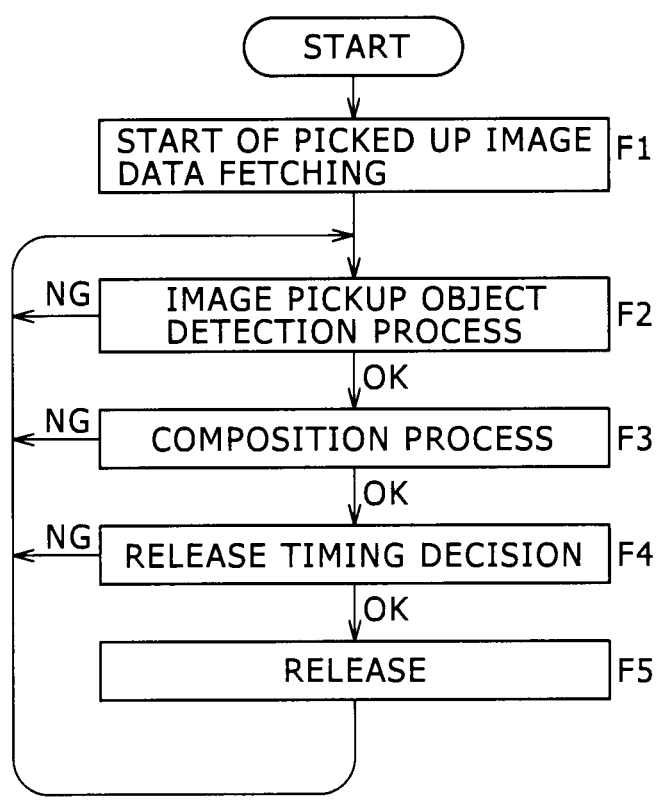
FIG. 10 is a flow chart illustrating automatic image pickup process of the image pickup system.

FIG. 10 illustrates a procedure where the functional blocks shown in FIG. 9 carry out predetermined processes as automatic still picture image pickup mode operation.

After still image pickup operation in the automatic image pickup mode is started, fetching of picked up image data is started at step F1 of FIG. 10

In particular, the picked up image recording control section 81 controls the image sensor 22 and the signal processing section 24 to start fetching of picked up image data for each frame.

An image pickup object detection process is carried out at step F2, and a composition process is carried out at step F3.

The image pickup object detection process and the composition process which includes optimum composition decision and composition adjustment are carried out by functions of the image pickup preparation processing section 82, particularly by processing of the control section 27 and/or the signal processing section 24.

After the fetching of picked up image data is started at step F1, the signal processing section 24 successively acquires frame image data corresponding to one still picture as picked up image data by the image sensor 22.

The image pickup preparation processing section 82 carries out, as the image pickup object detection process, processing of detecting an image portion corresponding to the face of a person from within the frame image data of each frame.

It is to be noted that the image pickup object detection process may be executed for all frames or frames at a predetermined number of frame intervals.

In the image pickup object detection process in the present example, for example, a face detection technique is utilized to set, for each image pickup object detected from within an image, a face range corresponding to the region of the image portion of the face of the image pickup object. Then, from information of the number, size, position and so forth of such face regions, information of the number of image pickup objects in the frame range, the size of each image pickup object, and the position of each image pickup object in the respective picture range is obtained.

It is to be noted that, although several techniques for detection of the face are known, which one of the detection techniques should be adopted is not limited particularly, but a suitable technique may be adopted taking the detection accuracy, the degree of difficulty in design and so forth into consideration.

As the image pickup object detection process at step F2, search for image pickup objects existing around the digital still camera 1 is carried out first.

In particular, the search for image pickup objects is carried out such that, while the control section 27 of the digital still camera 1, particularly the image pickup preparation processing section 82 and the image pickup visual field variation control section 83, carry out pan-tilt control for the camera platform 10 and zoom control for the optical system section 21 to vary the image pickup visual field, image pickup object detection by image analysis is executed, for example, by the signal processing section 24 or the control section 27.

Such image pickup object search is executed until after an image pickup object is detected in a frame image as picked up image data. Then, when the situation, in which the image pickup object (face) is present in the frame image, that is, in the image pickup visual field at the point of time, is obtained, image pickup object search is ended.

After the image pickup object detection process comes to an end, the control section 27, particularly the image pickup preparation processing section 82, carries out a composition process at step F3.

Although, in the present example, a tentative composition process and a regular composition process are carried out as the composition process, they are hereinafter described, but here, the composition process is described briefly.

In the composition process, it is decided whether or not the composition at the point of time is in an optimum state. In this instance, decision of a picture structure, in this instance, decision of the number of image pickup objects in the picture range, the size of the image pickup objects and the position of the image pickup objects, based on a result of the image pickup object detection is carried out first. Then, based on the information of the picture structure decided by the picture structure decision, a composition estimated to be optimum is decided in accordance with a predetermined algorithm.

Here, the compositions in this instance are determined by the individual image pickup visual fields in pan, tilt and zoom operations. Accordingly, depending upon a decision process regarding whether or not the composition is optimum, information of control amounts for pan, tilt and zoom operations for obtaining an optimum image pickup visual field in response to the image pickup detection result, that is, to the mode of an image pickup object in the picture range, is obtained as a decision result of the decision process.

Then, if the composition is not in an optimum state, then pan-tilt control and zoom control are carried out in order to obtain an optimum composition state.

In particular, the control section 27, particularly the image pickup preparation processing section 82 and the image pickup visual field variation control section 83, issue an instruction for variation of the pan-tilt control amounts determined by the optimum composition decision process to the control section 51 of the camera platform 10 side as composition adjustment control.

In response to the instruction, the control section 51 of the camera platform 10 calculates movement amounts regarding the pan mechanism section 53 and the tilt mechanism section 56 in accordance with the instruction control amounts and supplies control signals to the pan driving section 55 and the tilt driving section 58 so that pan driving and tilt driving of the calculated movement amounts may be carried out.

Further, the control section 27, particularly the image pickup preparation processing section 82 and the image pickup visual field variation control section 83, issue an instruction of information of the view angle regarding zoom operation calculated by the optimum composition decision process to the optical system section 21 so that zoom operation by the optical system section 21 is executed to obtain the instruction view angle.

It is to be noted that, if it is decided by the composition process that the composition is not an optimum composition and pan-tilt and zoom control is carried out as the composition adjustment, then the processing returns from step F3 to step F2 so that the image pickup detection process is carried out again. This is because an image pickup object may move out of the image pickup visual field by the pan, tilt or zoom operation or by a motion of the person.

If an optimum composition is obtained, then the control section 27, particularly the picked up image recording control section 81, carries out a release timing decision process at step F4.

It is to be noted that, although the release timing may not be decided OK by the release timing decision process at step F4, in this instance, the processing is carried out again beginning with the image pickup object detection at step F1. This is because an image pickup object may move out of the image pickup visual field or the composition may lose its shape as a result a motion of an image pickup object person or the like.

If it is decided by the release timing decision process that the release condition is satisfied, then automatic recording of the picked up image data is carried out as a release process at step F5. In particular, the control section 27, particularly the picked up image recording control section 81, carries out control of the encoding/decoding section 25 and the medium controller 26 to execute recording of the picked up image data or frame image obtained at the point of time into the memory card 40.

Incidentally, while the release timing decision process at step F4 is a process of deciding whether or not a predetermined still picture image pickup condition is satisfied in order to obtain an appropriate still picture, various examples are applicable.

For example, release timing decision based on time is applicable. For example, lapse of a predetermined period of time such as, for example, two or three seconds from a point of time at which OK decision regarding the composition process is obtained is determined as a still picture image pickup condition. In this instance, the control section 27, particularly the picked up image recording control section 81, carries out counting of a predetermined period of time at step F4. Then, if the predetermined period of time elapses, then the release process is carried out at step F5.

Further, when a particular sound input is detected, it may be decided that the still picture image pickup condition is satisfied.

For example, a particular word uttered from a user, sound by clapping of hands, sound of a whistle or the like may be used as the particular sound as the still picture image pickup condition.

The control section 27, particularly the picked up image recording control section 81, carries out input detection of such particular sounds at step F4.

Then, if any of such particular sounds is confirmed from a result of the input sound signal analysis from the sound inputting section 35 shown in FIG. 7, then it is decided that a release timing is reached, and a release process is executed at step F5.

It is to be noted that the sound inputting section 62 or the image pickup section 63 may be provided on the camera platform 10 side as described hereinabove with reference to FIG. 8.

Where the sound inputting section 62 is provided on the camera platform 10 side, if particular sound is confirmed from an input sound signal analysis result regarding an input sound signal to the sound inputting section 62, then it may be decided that a release timing is reached. For example, the control section 51 on the camera platform 10 side may carry out detection of particular sound and notify the control section 27 of the digital still camera 1 of such detection.

Or, it may be decided that a still picture image pickup condition is satisfied when a particular image pickup object state is discriminated from a picked up image.

The control section 27, particularly the picked up image recording control section 81, supervises presence/absence of the particular image pickup object state detected by the analysis of the picked up image at step F4.

The particular image pickup object state may be a particular expression such as a smile of an image pickup object caught by the composition process, a particular gesture such as, for example, waving of a hand toward the image pickup system, raising of a hand, clapping of hands or a behavior such as making of a V-sign or winking at the image pickup system. Or, the particular image pickup object state may be gazing of a user of an image pickup object at the image pickup system.

The control section 27 decides any of the particular states of the user by an image analysis process of the picked up image. Then, if a particular image pickup object state is detected, then it is decided that the release timing comes, and a release process is executed at step F5.

It is to be noted that the image pickup section 63 may be provided on the camera platform 10 side as described hereinabove with reference to FIG. 8.

Where the image pickup section 63 is provided on the camera platform 10 side, if a particular image pickup object state is confirmed from an analysis result of picked up image data from the image pickup section 63, then it may be determined that a release timing is reached. For example, the control section 51 on the camera platform 10 side may carry out detection of a particular image pickup state and notify the control section 27 of the digital still camera 1 of such detection.

As described above with reference to FIG. 10, with the image pickup system of the present embodiment, still picture image pickup in the automatic still picture image pickup mode is implemented based on the control and processing by the control section 27.

Here, in the present embodiment, while pan-tilt control is carried out as the image pickup object detection process and the composition process, it is detected from the picked up image data whether or not a target image pickup object is included in the image pickup visual field.

Then, when one or more target image pickup objects are detected, a process of composition adjustment which accompanies confirmation of other image pickup object around the detected image pickup object is carried out.

Then, when one or more target image pickup objects are detected, a process of tentative composition adjustment of carrying out composition adjustment while the image pickup visual field is varied so that some other image pickup object or objects around any of the detected image pickup objects can be confirmed is carried out first. Then, after completion of the tentative composition adjustment, a process for regular composition for varying the image pickup visual field in order to optimize the composition.

In the following, a composition process carried out at two stages of the tentative composition adjustment and the regular composition adjustment is described below in detail.

First, in order to facilitate understandings of the present embodiment, a basic composition process which corresponds to the regular composition process in the present example is described.

Figure 11:
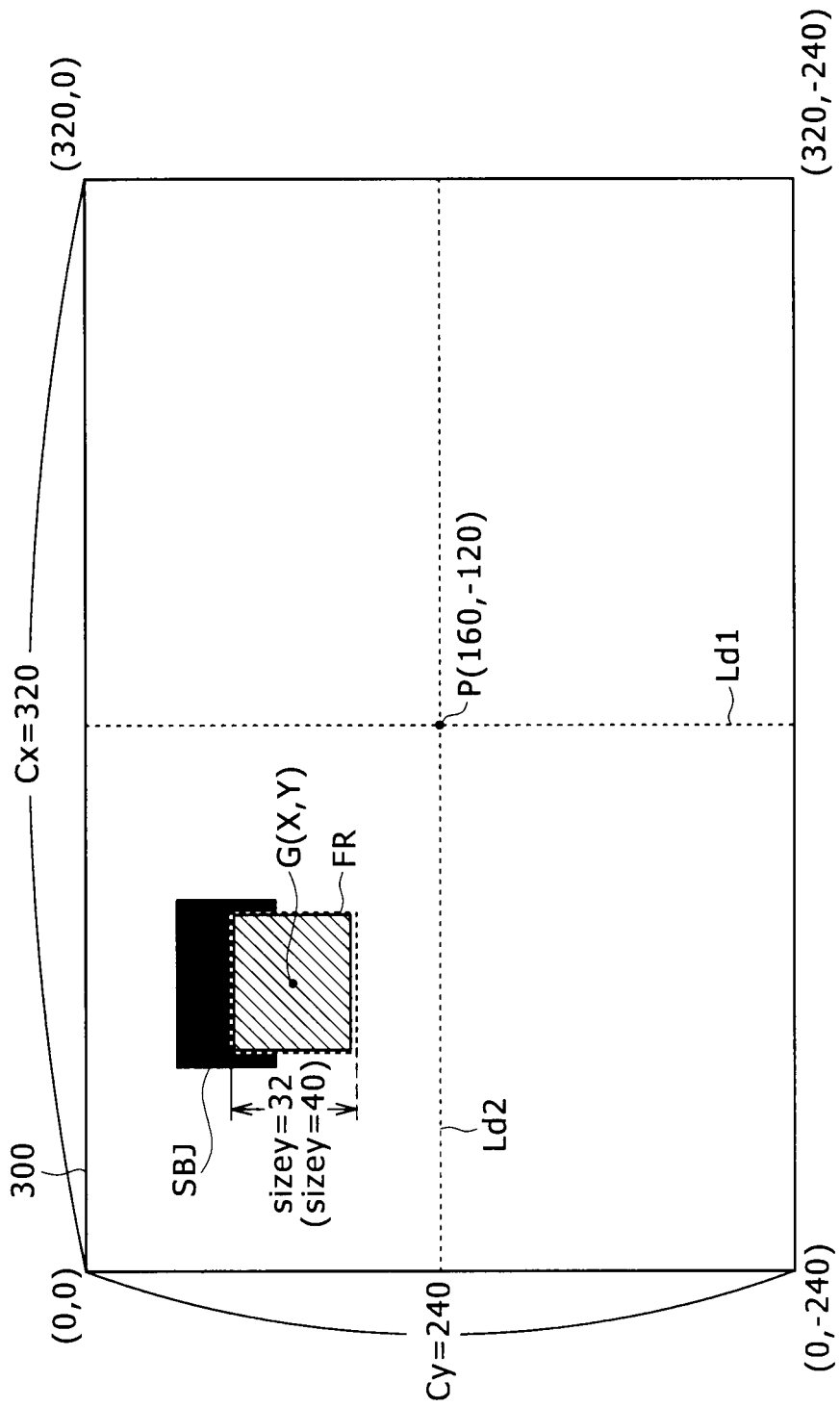

It is assumed here that, in the procedure of the image pickup object detection process, picked up image data of such picture contents as shown, for example, in a picture range 300 of FIG. 11. The picture contents of the picked up image data here include one image pickup object as a person.

The picture range 300 in this instance corresponds to an image region corresponding to one frame of the picked up image data. Here, it is assumed that the frame image as the picture range 300 is configured such that, where the horizontal pixel number, that is, the horizontal picture size, is Cx and the vertical pixel number, that is, the vertical picture size is Cy, it has a picture size of Cx=320 and Cy=240.

Further, a position on the picture range 300 in this instance is represented by coordinates (X, Y), and the position of the left upper corner of the picture range 300 is defined as coordinates (0, 0).

Further, a vertical reference line Ld1 and a horizontal reference line Ld2 are defined virtually on the picture range 300.

The vertical reference line Ld1 is a straight line passing the middle point of the picture range 300 in the horizontal direction, and the horizontal reference line Ld2 is a straight line passing the middle point of the picture range 300 in the vertical direction. The vertical reference line Ld1 and the horizontal reference line Ld2 are used as reference lines when the position of an image pickup object on the picture range 300 is moved in the horizontal and vertical directions in composition control, respectively.

Meanwhile, the coordinates (160, −120) of a cross point of the vertical reference line Ld1 and the horizontal reference line Ld2 are treated as a reference point P in the composition control.

If image pickup object detection or face detection is carried out for the picked up image data of the picture contents illustrated in FIG. 11, then the face of the one image pickup object SBJ shown in FIG. 11 is detected as a detection image pickup object. In particular, detection of one face by the face detection process is regarded as detection of one image pickup object. Then, as a result of the detection of the image pickup object in this manner, information of, for example, the number, direction, position and size of image pickup objects is obtained.

As regards the number of image pickup objects, for example, the number of faces detected by the face detection may be determined. Since, in the case of FIG. 11, the number of faces to be detected is one, a result that the number of image pickup objects is one is obtained.

Further, when a technique of face detection is used to carry out image pickup object detection, as a result of the detection, a framework, that is, a face framework FR, is set to the detected face portion of the image pickup object.

In FIG. 11, it is shown that the face framework FR is disposed corresponding to the face portion of an image of the image pickup object SBJ. The face framework FR in this instance has a quadrangular shape corresponding to the image portion of the face of the detected image pickup object. It is to be noted that it is assumed that the face framework FR here has a square shape.

Further, the face framework FR is set to the image portion as the face on the picture range 300. Accordingly, also the position and size of the face framework FR on the picture range 300 are changeably set in response to the position, size and so forth of the face of the image pickup object on the picture range 300 detected by the face detection process at this time.

Further, as regards the position information of each image pickup object, at least a image pickup object gravity center G(X, Y) which is the center of gravity of the image pickup object SBJ in an image as picked up image data is determined.

Further, as regards how to set the image pickup object gravity center G, for example, any image pickup object gravity center detection method already known can be adopted. As an example, a cross point of diagonal lines of the quadrangle of the face framework FR detected corresponding to the image pickup object SBJ may be determined as the image pickup object gravity center.

Meanwhile, as regards the size of the image pickup object, it is assumed that it is represented by the size, that is, the number of pixels, of one side of the face framework FR in the vertical or horizontal direction.

In FIG. 11, a state in which a vertical size sizey of the face framework FR is detected as sizey=32 is illustrated as an example.

Further, it is assumed that, as regards the face direction for each image pickup object, it is detected as one of three directions including the leftward, forward and rightward directions.

It is assumed that it is detected from the image pickup object SBJ shown in FIG. 11 that the face direction is the forward direction.

Here, it is assumed that a result of decision that such a composition as shown in FIG. 12 should be used is obtained by the composition decision process based on image pickup object detection information of the image pickup object SBJ detected in such a manner as seen in FIG. 11.

Referring to FIG. 12, in the composition shown, the image pickup object size is set to the vertical size sizey=64 and the image pickup object gravity center G is positioned at G(160, −120+Δy).

Although the composition differs, for example, also depending upon the number of detected image pickup objects, in order to obtain a good composition, it is demanded to make the size of the image pickup object on the picture range 300 not excessively small or great but appropriate. The image pickup object size of the vertical size sizey=64 shown in FIG. 12 is decided as a value of an optimum size of the image pickup object SBJ on the picture range 300.

Meanwhile, the disposition position of the image pickup object gravity center G described above is determined, for example, based on the following grounds.

Where a single image pickup object SBJ is involved, the simplest and most basic position of the image pickup object SBJ is the center of the picture range 300. In other words, the image pickup object gravity center G is positioned at the reference point P.

However, such a composition that the image pickup object is positioned at the center of the screen is generally regarded as a typical one of undesirable compositions. It is generally considered that a good composition is obtained by displacing the position of an image pickup object from the center of the screen in accordance with a certain rule as represented, for example, by a three-division method or a golden rule method.

Thus, in this instance, the position of the image pickup object SBJ, that is, the image pickup object gravity center G, in the vertical direction of the picture range 300 is displaced by a fixed distance from the horizontal reference line Ld2.

The amount of displacement of the image pickup object gravity center G in the vertical direction with reference to the horizontal reference line Ld2 in this manner is defined as vertical offset amount Δy. This vertical offset amount Δy and a horizontal offset amount Δx hereinafter described can be represented, for example, by the quantity of pixels. In this instance, the Y coordinate of the image pickup object gravity center G in FIG. 12 is represented as (−120+Δy).

It is to be noted here that the vertical offset amount Δy is given as a positive value so that the image pickup object gravity center G is positioned in a region of the picture range 300 on the upper side of the horizontal reference line Ld2 as seen in FIG. 12.

Meanwhile, the position of an image pickup object in the horizontal direction is based on the face direction detected from the image pickup object.

As described hereinabove with reference to FIG. 11, the face direction of the image pickup object SBJ in this instance is detected as the forward direction from among the three rightward, forward and left directions.

Here, where the face direction of the one image pickup object SBJ is detected as the forward direction, the image pickup object is positioned at the center in the horizontal direction. In other words, the X coordinate of the image pickup object gravity center G is set to the middle point in the horizontal direction, that is, to the X coordinate (160) same as that of the vertical reference line Ld1, that is, the reference point P.

In this instance, the horizontal offset amount Δx defined as the amount of movement of the image pickup object gravity center G in the horizontal direction with reference to the vertical reference line Ld1 is set to 0.

FIG. 12 illustrates the image pickup object gravity center G (160, −120+Δy) set in accordance with such rules and algorithm of the composition decision as described above.

After all, the process of adjusting the composition from the state of FIG. 11 to the state of FIG. 12 is a process of moving the center of gravity of the face of an image pickup object into a predetermined target range by pan-tilt operations and setting the size of the image pickup object to an appropriate size by a zoom operation. Then, the target range is set in response to the size, number, direction of the face and so forth of such image pickup objects SBJ.

For example, in the case of FIG. 12, since the face is directed forwardly, a target range TA is set as seen in FIG. 23A, and the image pickup object gravity center G is included in the target range TA.

In response to the setting of the target range TA, the horizontal offset amount Δx and the vertical offset amount Δy are determined, and the composition adjustment is carried out so that the image pickup object gravity center G is finally included in the target range TA.

Figure 13A:
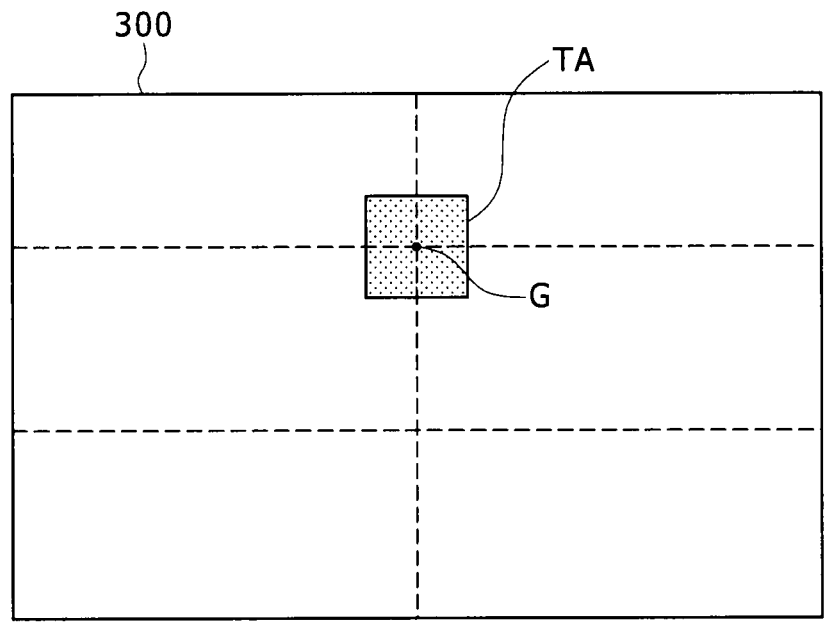
FIGS. 13A and 13B are diagrammatic views illustrating a target range in the composition process.

While FIG. 13A shows the target range TA where the face direction of the image pickup object SBJ is the forward direction, depending upon the direction of the face, the target range TA is set in a different manner.

For example, it is assumed that the detected face direction of the image pickup object is the leftward direction. It is to be noted here that the leftward face direction here signifies a direction of the face in a state in which, where the picture contents of the picture range 300 are viewed actually, to a person who watches the picture range 300, the face of the image pickup object SBJ looks directed to the left side on the picture range 300. Incidentally, actually the person itself of the image pickup object SBJ is directed to the right side where the direction in which the person opposes to the image pickup apparatus by which the image of the person was picked up is the forward direction.

In this instance, as regards the position of the image pickup object gravity center G in the horizontal direction, it is positioned, from between two left and right image regions or divisional regions into which the region of the picture range 300 is divided by the vertical reference line Ld1, in the "right" image region on the opposite side to the "left" indicated by the face direction. Consequently, in the picture range 300, a space is obtained on the left side toward which the face of the image pickup object SBJ is directed.

Figure 13B:
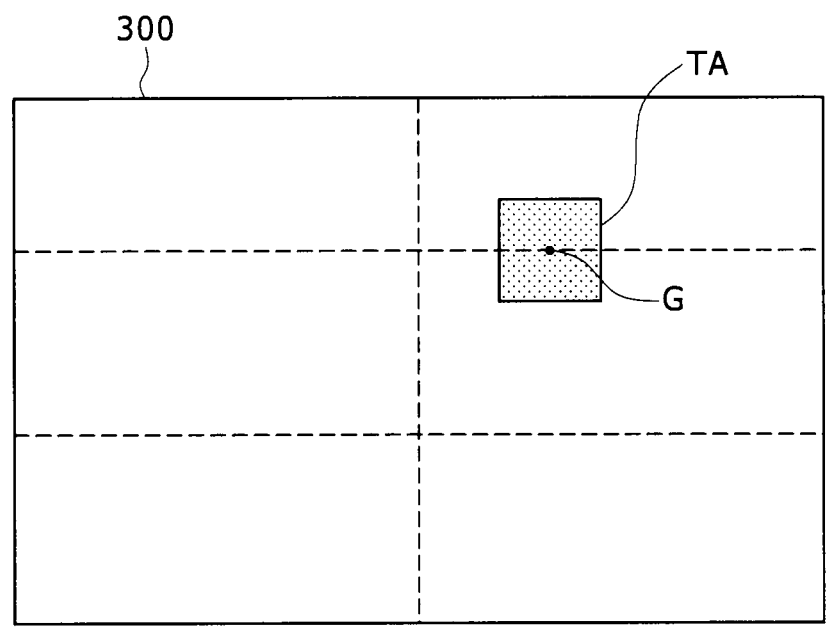

In short, the target range TA is set to the right side image region with respect to the vertical reference line Ld1 as seen in FIG. 13B. Then, the image pickup object gravity center G is moved into the target range TA.

By setting the composition in such a manner as described above, a better result is obtained, for example, in comparison with another composition wherein the image pickup object is positioned such that the image pickup object gravity center G of the image pickup object SBJ whose face direction is the leftward direction corresponds to or coincides with the center of the screen in the leftward and rightward direction or a further composition wherein the target range TA is set to the left side image region with respect to the vertical reference line Ld1.

On the other hand, where the detected face direction of the image pickup object is the rightward direction, the image pickup object gravity center G is set to the left side image region from between the two left and right divisional image regions split by the vertical reference line Ld1 conversely to that in the case in which the detected face direction is the leftward direction.

Further, where a plurality of image pickup objects are detected, an image region including the plural detected image pickup objects are regarded as a single integrated image pickup object, and a single image pickup object gravity center GG, that is, a single integrated image pickup gravity center GG, is determined from the integrated image pickup object.

Figure 14A:
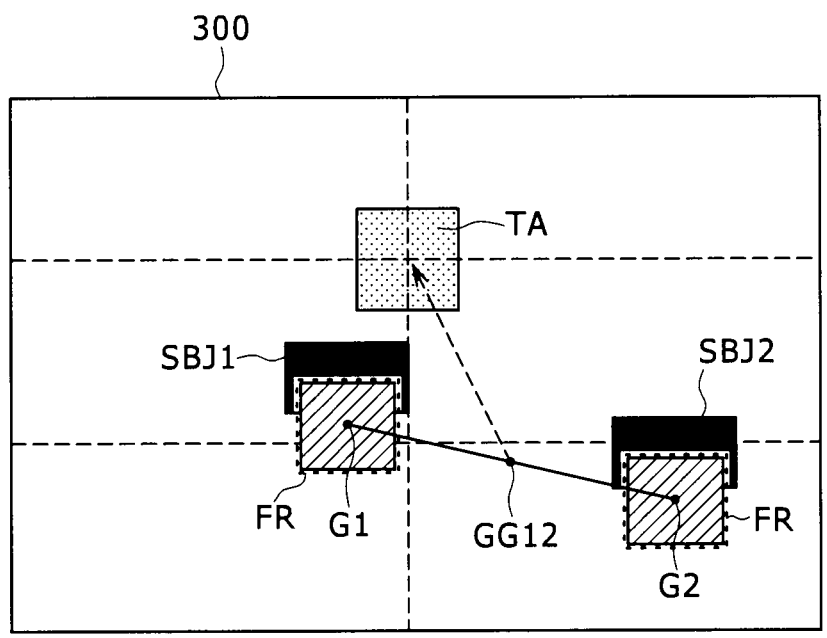
FIGS. 14A and 14B are diagrammatic views illustrating arrangement of the center of gravity in the target range in the composition process.

For example, FIG. 14A illustrates an example wherein two image pickup objects SBJ1 and SBJ2 are detected. The center of gravity of the gravity centers G1 and G2 of the image pickup objects SBJ1 and SBJ2 becomes an integrated image pickup object gravity center GG12.

It is assumed that the target range TA is set to a position shown in FIG. 14A from the number, direction of the face and size of the image pickup objects.

In this instance, the composition adjustment is carried out in such a manner that the integrated image pickup object gravity center GG12 is included in the target range TA as indicated by an arrow mark.

Figure 14B:
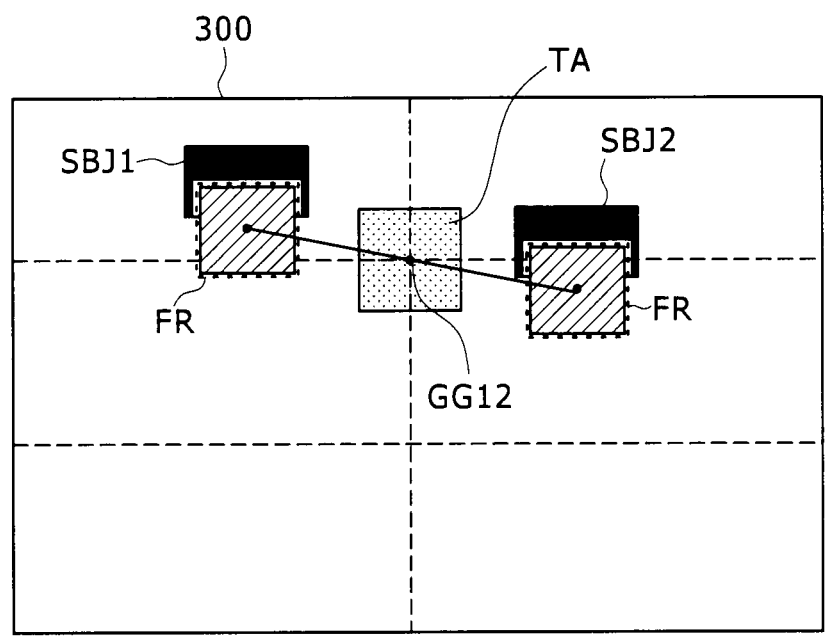

As a result, such a composition as shown in FIG. 14B is obtained.

The image pickup object gravity center G can be set in several different manners. FIGS. 14A and 14B illustrate the simplest example of such setting wherein the middle point of a line segment interconnecting the centers (G1 and G2) of gravity of those ones of a plurality of detected image pickup objects which are positioned on the most left side and the most right side within the picture range 300 is set as the integrated image pickup object gravity center GG12.

Where a plurality of image pickup objects are involved, the face directions individually detected from the individual image pickup objects are sometimes different from each other. In this instance, one face direction of the integrated image pickup object may be determined based on the relationship of the face directions detected for the individual image pickup objects. As the relationship of the face directions detected for the individual image pickup objects, where the number of same face directions occupies more than a predetermined rate in the total number of image pickup objects, the same face direction is determined as the face direction of the integrated image pickup object and is used for the composition setting and the setting of the target range TA.

As can be recognized from the foregoing description, the target range TA in which the image pickup object gravity center or the integrated image pickup object gravity center is to be disposed is determined from the size, number and direction of image pickup objects. Then, whether or not the composition is optimum is decided depending upon whether or not the image pickup object gravity center or the integrated image pickup object gravity center is included in the target range TA. Also, whether or not the image pickup object size is optimum is determined.

Then, if it is decided that the composition is not optimum, then as a process for the composition adjustment, the position of the image pickup object gravity center G is changed so that the image pickup object gravity center or the integrated image pickup object gravity center may be included in the target range TA, or the image pickup object size is varied so as to be appropriate.

The variation of the position of the image pickup object gravity center G or the integrated image pickup object gravity center GG is carried out, in regard to the horizontal direction, by pan control for the pan mechanism of the camera platform 10. On the other hand, in regard to the vertical direction, the variation is carried out by tilt control for the tilt mechanism of the camera platform 10.

The variation of the image pickup object size is carried out by control for moving the zoom lens of the optical system section 21 of the digital still camera 1, that is, by zoom control. Alternatively, the variation may be carried out by such an image signal process as image cutting out for picked up image data.

The basic composition process is such as described above. The basic composition process in the present embodiment is executed as a process for the regular composition adjustment in the present embodiment.

However, when control of moving the image pickup object gravity center G into the target range TA described above is carried out, even if an optimum composition is obtained within the image pickup visual field at the point of time, actually there is a case in which a more appropriate composition exists.

For example, although a plurality of persons exist in the neighborhood, a composition is adjusted with a smaller number of persons and may possibly be different from a composition for a maximum number of persons.

Figure 15:
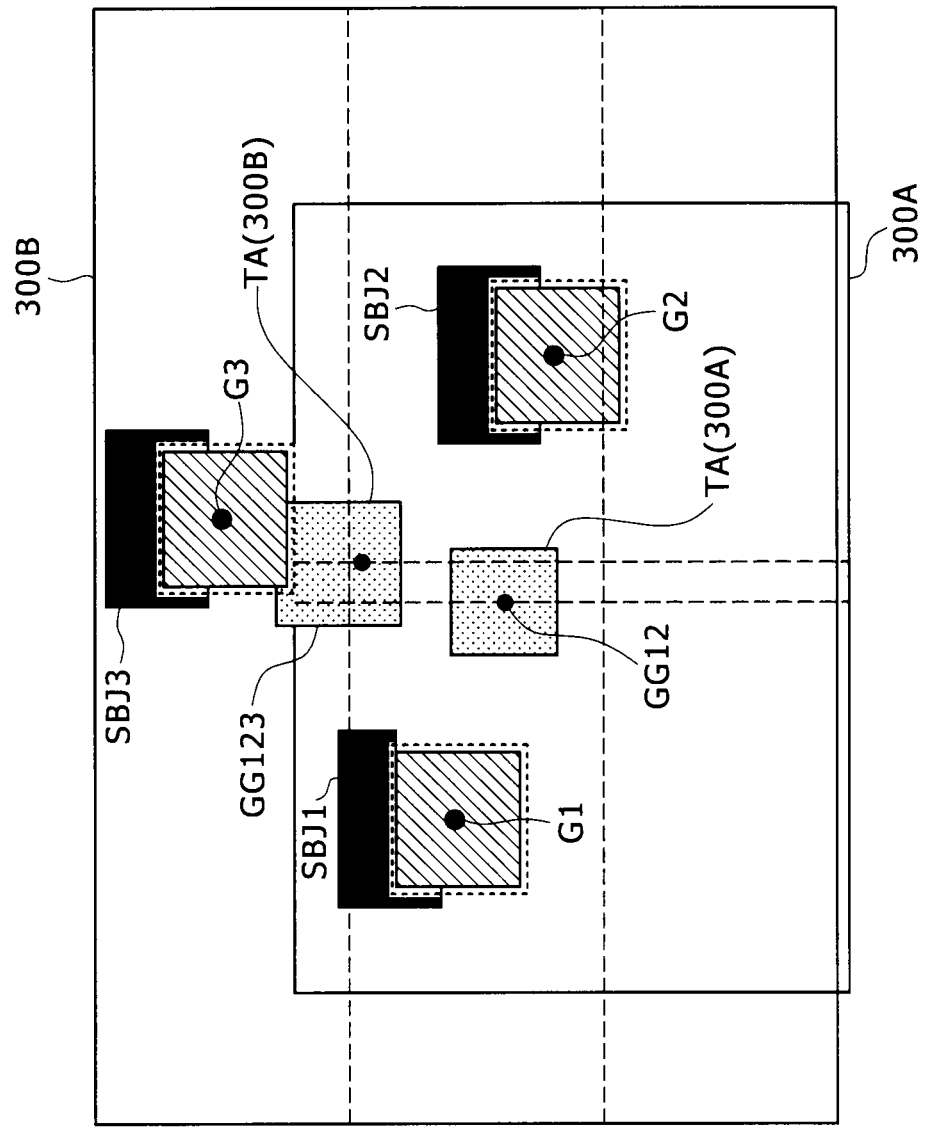
FIGS. 15, 16A and 16B are diagrammatic views illustrating a local solution and the best solution in the composition process.

An example is shown in FIG. 15.

Referring to FIG. 15, an image pickup visual field indicated by a picture range 300A is an optimum composition as a local solution. In particular, if two image pickup objects SBJ1 and SBJ2 are detected by the image pickup object detection process although three persons are positioned in the neighborhood, the integrated image pickup object gravity center GG12 of the two image pickup objects SBJ1 and SBJ2 is included in the target range TA, that is, in the picture range 300A.

However, in this instance, the image pickup visual field as the best solution is such as shown as a picture range 300B. In particular, the integrated image pickup object gravity center GG123 of the three persons of the image pickup objects SBJ1, SBJ2 and SBJ3 is included in the target range TA of the picture range 300B.

If such a search that tilting up is carried out from below in the procedure of the image pickup object detection process and two image pickup objects SBJ1 and SBJ2 are detected first, then a composition process is carried out only with the two image pickup objects SBJ1 and SBJ2 and still picture image pickup is carried out with the composition as the local solution.

Figure 16A:
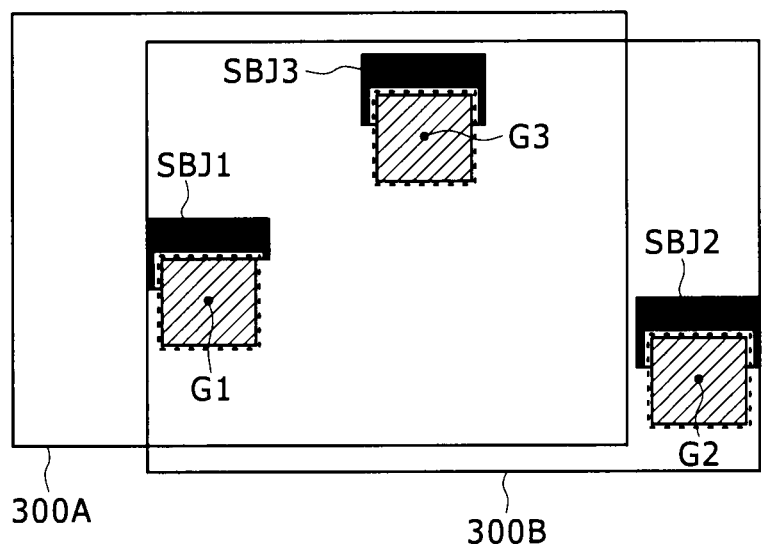

Also FIG. 16A similarly shows a picture range 300A where the composition is a local solution and another picture range 300B where the composition is the best solution.

If it is assumed that such a search that a pan operation proceeds from the left to the right in the procedure of the image pickup object detection process and two image pickup objects SBJ1 and SBJ3 are detected first, then a composition process is carried out only with the two image pickup objects SBJ1 and SBJ3. Therefore, still picture image pickup is carried out with the composition as a local solution.

In image pickup in the automatic still picture image pickup mode, even if still picture image pickup is carried out with the composition as the local solution, there is no serious trouble. This is because image pickup in the automatic still picture image pickup mode demands no cameraman and besides there is another object that the user thereby obtains a natural image without being conscious of the camera.

However, if it is intended to precisely pick up an image of a number of persons as great as possible, then a more appropriate composition may be available, and, as a result of image pickup, the composition as the local solution may not satisfy the demand of the user.

For example, for a scene of a party or the like in which several people are chatting or a like scene, a composition which includes the gathering people is considered more appropriate than another composition which includes only one of the people.

Where it is tried to include a number of people as great as possible, it is necessary to look around a detected image pickup object once.

Therefore, in the present embodiment, the composition process in the automatic still picture image pickup mode includes a process of moving, when one or more image pickup objects are detected in the image pickup visual field, the image pickup visual field further to confirm presence of some other image pickup object or objects in accordance with the image pickup request.

In particular, the process for composition adjustment is carried out at two stages of the tentative composition adjustment and the regular composition adjustment described below.

The tentative composition adjustment is a process for searching whether or not there exists some other image pickup object before pan-tilt operations to a composition which is a target as a regular composition are carried out upon composition adjustment. For example, the tentative composition adjustment is a process of carrying out pan-tilt operations so that the pan-tilt amounts intentionally exceed the target range TA of the regular composition to search whether or not there exists some other image pickup object.

An actual process is carried out by changing the target range TA between the tentative composition adjustment and the regular composition adjustment.

The tentative composition adjustment is described with reference FIGS. 17A and 17B.

Figure 17A:
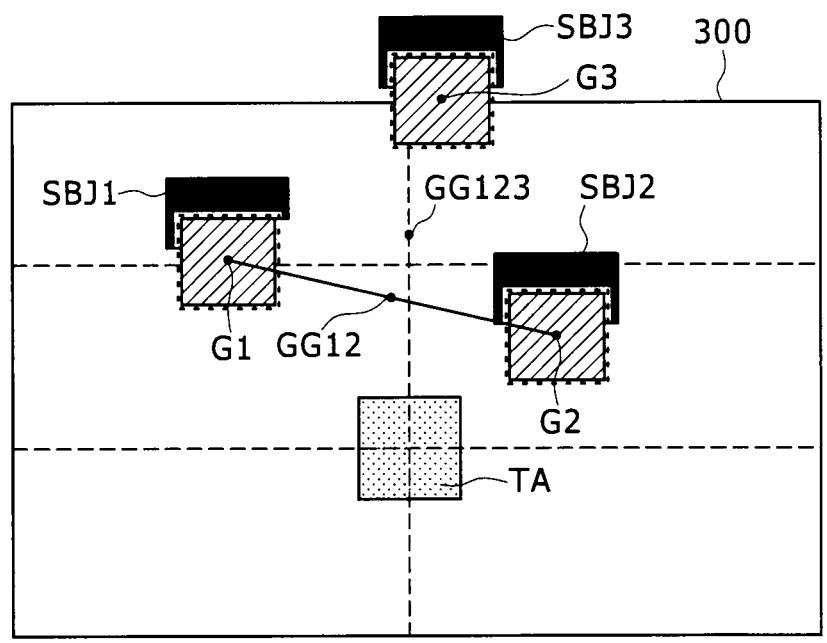
FIGS. 17A and 17B are diagrammatic views illustrating tentative composition adjustment.

FIG. 17A shows an example wherein three image pickup objects SBJ1, SBJ2 and SBJ3 of persons exist. Here, it is assumed that the image pickup objects SBJ1 and SBJ2 of two persons are detected in a procedure of tilting from below to above in the image pickup object detection process.

Here, the composition process is entered, and first, the tentative composition adjustment is carried out.

In this instance, the target range TA is set to a lower position in comparison with that in the case of normal composition adjustment described hereinabove in the picture range 300 as shown in FIG. 17A.

First, since the image pickup objects SBJ1 and SBJ2 are detected already, in the composition adjustment, pan-tilt control is carried out such that the integrated image pickup object gravity center GG12 of the image pickup objects SBJ1 and SBJ2 is included in the target range TA. In the case of the present example, tilt up is carried out in order that the integrated image pickup object gravity center GG12 may be included in the target range TA.

However, in this instance, since the target range TA is set to a lower position in comparison with that in the case of normal setting, the tilt up amount is greater than that in the case of the normal composition adjustment and tilt up is carried out further upwardly.

Then, the image pickup object SBJ3 is newly detected in the procedure.

In this instance, the composition process is carried out again in response to the detection of the image pickup objects SBJ1, SBJ2 and SBJ3. In this case, tentative composition process is carried out first. Now, tilt up is carried out so that the integrated image pickup object gravity center GG123 of the image pickup objects SBJ1, SBJ2 and SBJ3 is included in the target range TA.

Figure 17B:
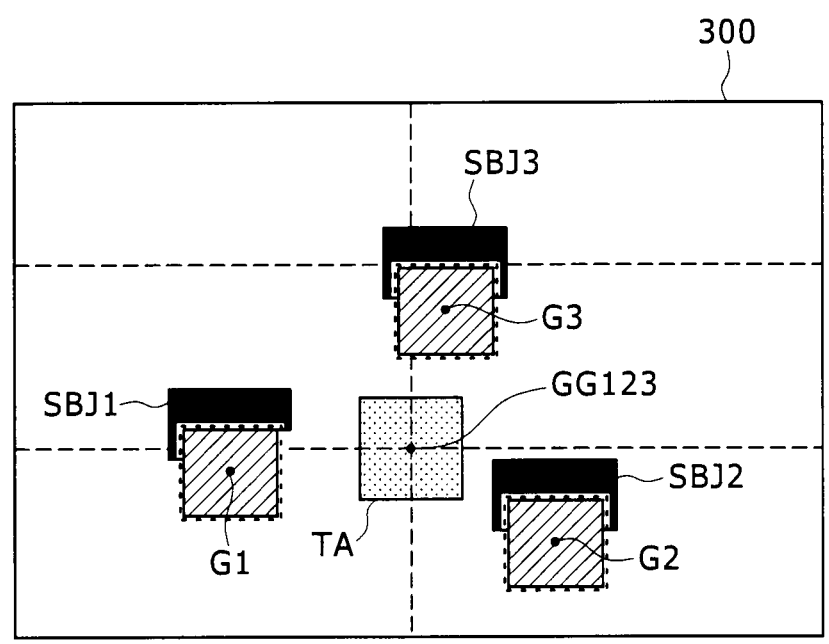

Then, if no other image pickup object exists above the image pickup object SBJ3, then the tentative composition adjustment is completed after all as seen in FIG. 17B.

If the tentative composition adjustment is completed, then the regular composition adjustment is carried out subsequently. The regular composition adjustment here signifies the normal composition adjustment described hereinabove.

Figure 18A:
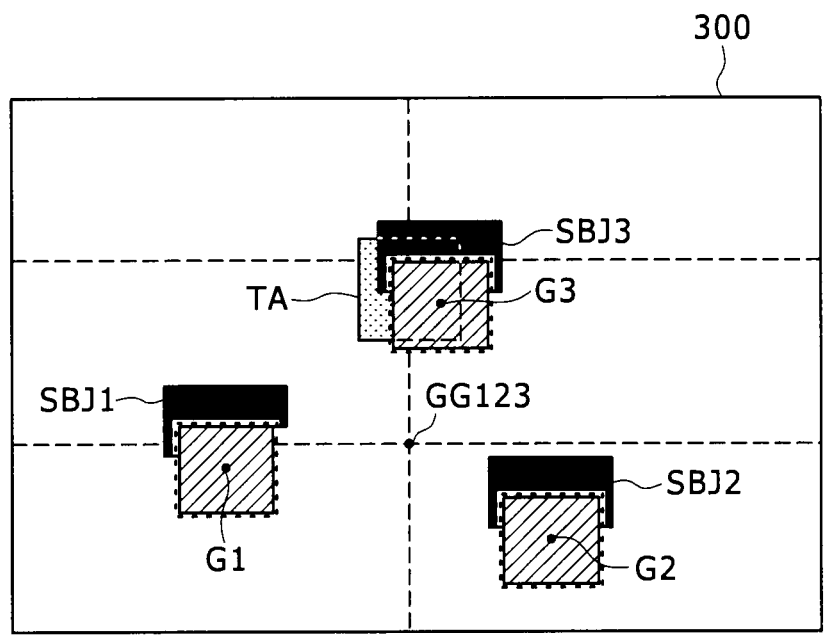
FIGS. 18A and 18B are diagrammatic views illustrating regular composition adjustment after the tentative composition adjustment.

FIG. 18A illustrates the picture range 300 in a state in which the tentative composition adjustment is completed. When the regular composition adjustment is to be carried out, the target range TA is set to a normal position shown in FIG. 18A. In particular, in this instance, the target range TA used in the tentative composition adjustment is re-set to an upper portion in the picture range 300.

Then, pan-tilt control is carried out so that the integrated image pickup object gravity center GG123 is included in the target range TA. In this instance, tilt down control is carried out.

Figure 18B:
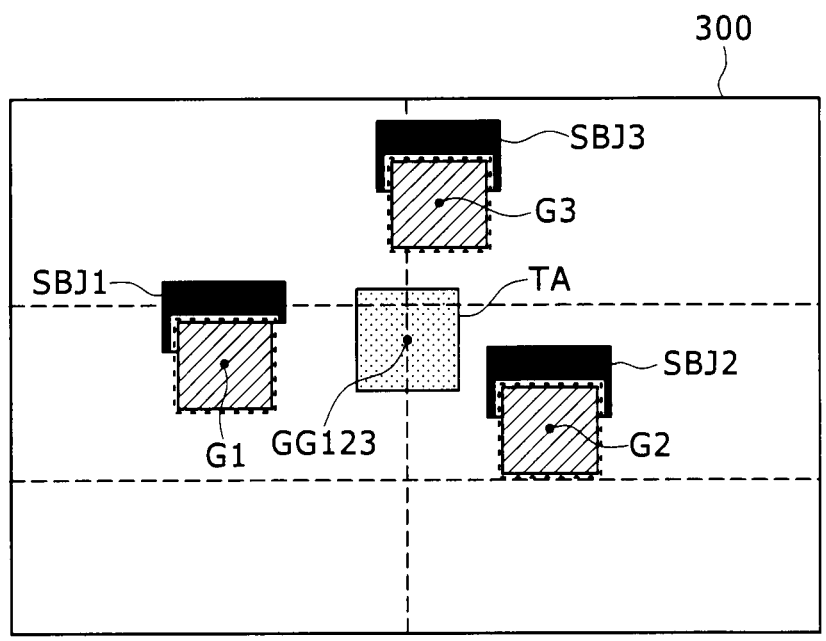

Then, a state illustrated in FIG. 18B is established, and since the integrated image pickup object gravity center GG123 is included in the target range TA, the regular composition adjustment is completed.

After all, an optimum composition including the image pickup objects SBJ1, SBJ2 and SBJ3 of three persons is obtained at the time of completion of the regular composition adjustment.

For example, in the tentative composition adjustment, the target range TA is set to a position different from a normal position in accordance with a searching direction upon the regular composition adjustment, particularly to a position within the picture range 300 on this side with respect to the variation direction of image pickup visual field as described above. Consequently, the target range TA is positioned once at a position a little beyond the position of the composition to which it should be adjusted finally. It is confirmed thereby whether or not there exists some other image pickup object within a range in the searching direction.

Since, in the examples shown in FIGS. 17A to 18B, tilt up is successively carried out upon tentative composition adjustment, the target range TA upon tentative composition adjustment is set lower in comparison with the normal position.

Figure 19A:
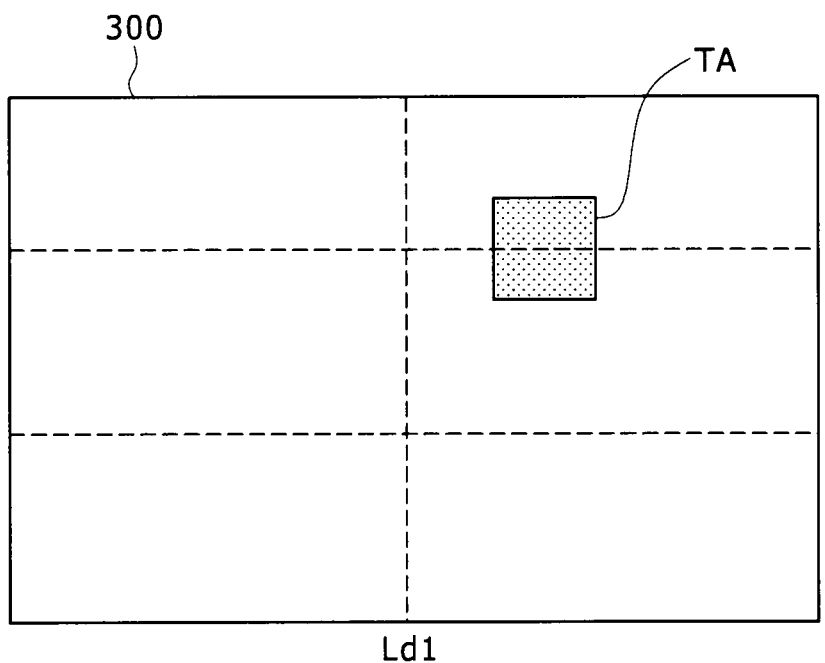
FIGS. 19A and 19B are diagrammatic views illustrating target ranges in the tentative composition adjustment.

If it is assumed that a pan operation is carried out from the right to the left upon tentative composition adjustment and the target range TA in the regular composition is placed on the vertical reference line Ld1, then the target range TA upon tentative composition adjustment is placed on the right side with respect to the vertical reference line Ld1 as shown in FIG. 19A. Consequently, it can be confirmed whether or not there exists some image pickup object on the further left side.

Figure 19B:
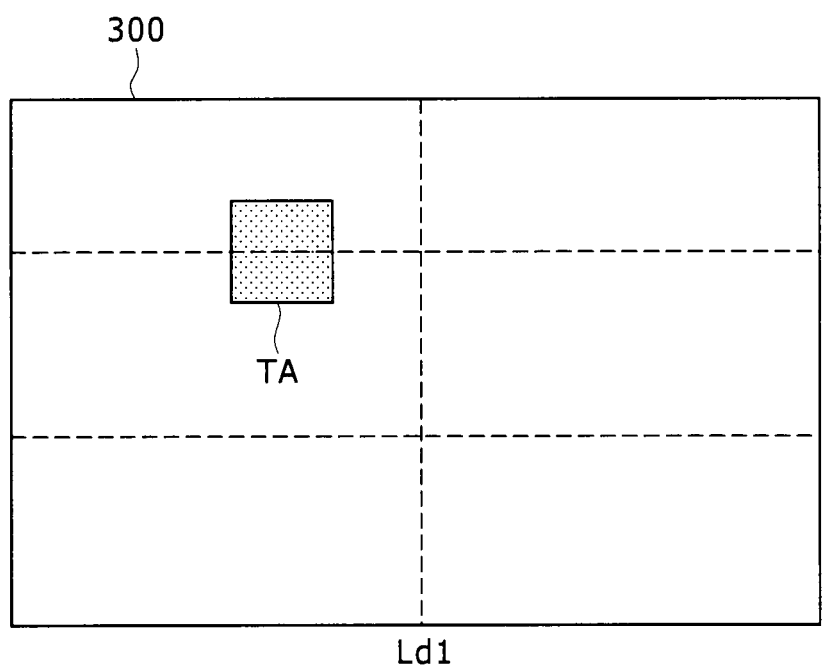

Further, if it is assumed that panning is carried out from the left to the right upon tentative composition adjustment and the target range TA in the regular composition is placed on the vertical reference line Ld1, then the target range TA upon tentative composition adjustment is placed on the left side with respect to the vertical reference line Ld1 as shown in FIG. 19B. Consequently, it can be confirmed whether or not there exists some image pickup object on the further right side.

In this manner, a target range TA different from that in the regular composition adjustment is set to carry out the tentative composition adjustment. It is considered that the target range TA in processing of the tentative composition adjustment is set such that the variation width of the image pickup visual field is greater than that upon the regular composition adjustment.

After such tentative composition adjustment, the regular composition adjustment is carried out.

By the composition adjustment described above, still picture image pickup condition without a miss of an image pickup object can be anticipated. In other words, still picture image pickup can be carried out setting a number of image pickup objects as great as possible as a target.

It is to be noted that, where the detected face of a certain image pickup object overlaps with an end region of the picture region in the procedure of pan-tilt operations in the tentative composition adjustment, also a process that no further pan-tilt process is carried out can be used.

Further, even if the center of gravity varies depending upon the direction of the face upon regular composition adjustment, also it seems a possible idea to ignore the direction of the face upon tentative composition adjustment.

Figure 16B:
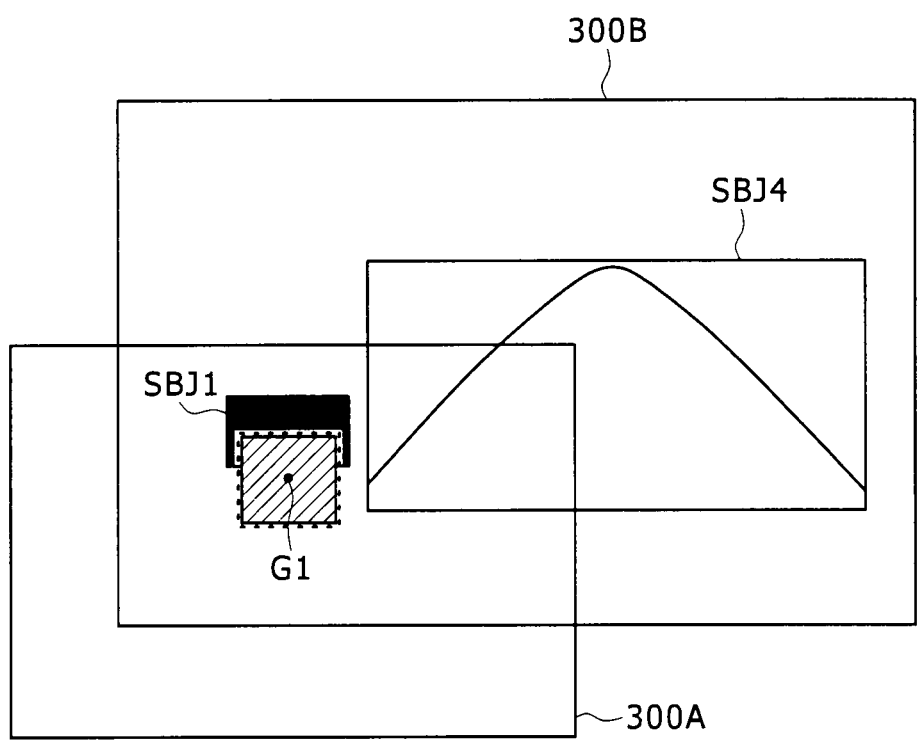

Further, while a representative example of an image pickup object is the face of a person, where a noticed region other than the face of a person such as an image pickup object SJB4 in FIG. 16B can be extracted, also it seems a possible idea to combine the face of a person and such a noticed region as just described to carry out composition adjustment.

A composition process including the tentative composition adjustment is described with reference to FIGS. 20A to 21B.

Figure 20:
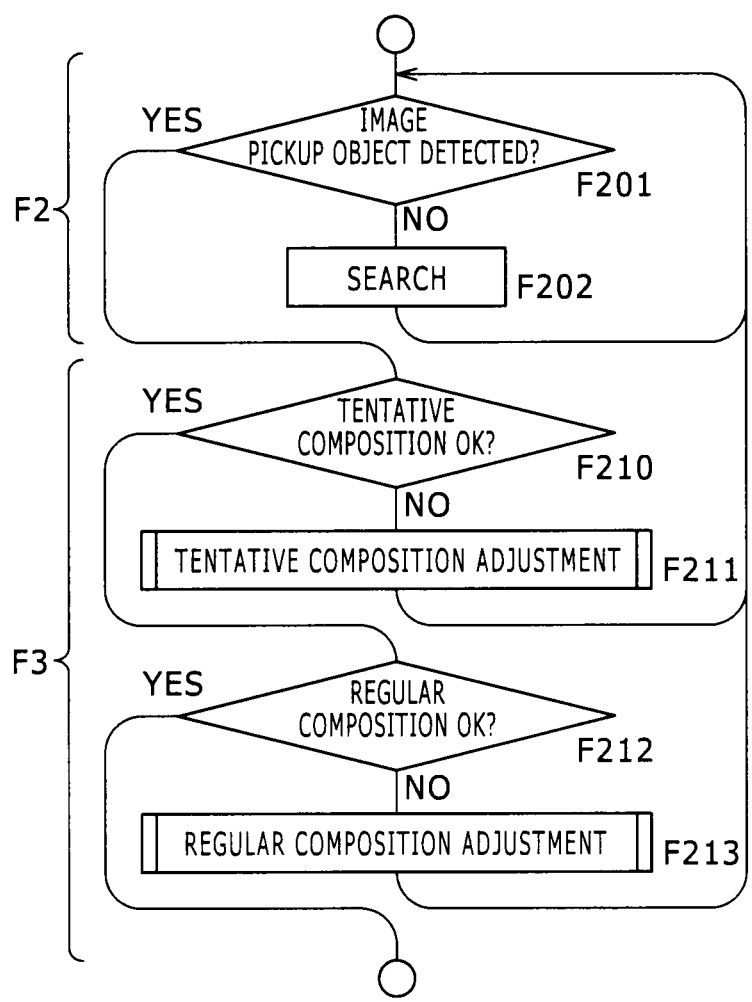
FIG. 20 is a flow chart illustrating a composition process of the image pickup system.

FIG. 20 illustrates an image pickup object detection process and a composition process carried out at steps F2 and F3 in FIG. 10.

First, as the image pickup object detection process at step F2 described with reference to FIG. 10, the control section 27, particularly the image pickup preparation processing section 82, confirms whether or not an image pickup object is detected at step F201 in FIG. 20.

If an image pickup object is not detected, then the control section 27, particularly the image pickup preparation processing section 82, executes a searching process at step F202. Then, the control section 27 confirms whether or not an image pickup object is detected at step F201.

In particular, in the processes at step F201 and F202, the control section 27, particularly the image pickup preparation processing section 82 and the image pickup view field variation control section 83, carry out pan-tilt control for the camera platform 10 and carry out zoom control for the optical system section 21 to confirm whether or not image pickup object detection by image analysis by the signal processing section 24 or the control section 27 is carried out while varying the image pickup visual field.

If an image pickup object is detected, then the control section 27, particularly the image pickup preparation processing section 82, carries out processes at steps F210 to F213 of FIG. 20 as the composition process at step F3 of FIG. 10.

The control section 27, particularly the image pickup preparation processing section 82, carries out the tentative composition process.

Referring to FIG. 20, the control section 27 carries out a process of confirmation of whether or not the tentative composition is in an optimum composition state as a tentative composition at step F210 and carries out a process of tentative composition at step F211. The processes are, for example, those described hereinabove with reference to FIGS. 17A and 17B and FIGS. 19A and 19B.

In particular, decision of a picture structure based on the image pickup object detection result, that is, decision of the number of image pickup objects in the picture range, the image pickup object size, the direction of the face and so forth, is carried out first, and then a target range TA for a tentative composition is determined. Then, it is decided whether or not the tentative composition is in an optimum state, and if the tentative composition is not in an optimum state, then the image pickup visual field is varied by pan-tilt and zoom control as tentative composition adjustment.

It is to be noted that, also where pan-tilt and zoom control is to be carried out as the tentative composition adjustment, the processing returns to step F201 to carry out the processes beginning with the image pickup detection again. This is because there is the possibility that an image pickup object may disappear by variation of the image pickup visual field or by movement of the user.

Further, since, in such tentative composition adjustment as described above, the image pickup visual field is moved by a greater amount than that in the normal composition adjustment, there is the possibility that a new image pickup object may be detected. In this instance, the tentative composition adjustment is carried out again based on the image pickup object gravity center G or the integrated image pickup object gravity center GG including the new image pickup object.

An example of a procedure of the tentative composition adjustment at step F211 is illustrated in FIG. 21B.

Referring to FIG. 21B, the control section 27 sets a target range TA for obtaining a tentative composition at step F310. For example, as described with reference to FIGS. 17A, 17B, 19A and 19B, a target range TA different from an original target range TA is set in response to a search direction.

Then at step F311, the control section 27 decides the horizontal offset amount Δx in response to the set target range TA.

Then, at step F312, the control section 27 executes pan control so that the image pickup object gravity center G or the integrated image pickup object gravity center GG may be positioned on the X-coordinate corresponding to the decided horizontal offset amount Δx.

Then, at step F313, the control section 27 decides a vertical offset amount Δy for the target range TA. Then, at step F314, the control section 27 executes tilt control so that the image pickup object gravity center G or the integrated image pickup object gravity center GG is positioned on a Y-coordinate corresponding to the decided vertical offset amount Δy.

Then, at step F315, the control section 27 decides a zoom magnification Z.

As described above, size variation of the image pickup object SBJ in the picture range 300 is carried out by varying the picture angle by zoom control. Here, the zoom magnification signifies a magnification of the picture angle necessary for obtaining an image pickup object size decided in response to an optimum composition from an image pickup object size when an image pickup object is detected by the image pickup object detection process.

Therefore, the control section 27 first decides a target image pickup object size, that is, a zoom control target value, necessary for an optimum composition in accordance with a predetermined rule in response to a condition of the detected image pickup object.

Then, the ratio between the target image pickup object size size_trg determined as described above and the image pickup object size size_org, which is a size or a number of pixels of one side in the vertical direction or in the horizontal direction of a face framework FR, is calculated and then the calculated ratio is determined as the zoom magnification Z. Particularly, the zoom magnification Z is calculated by the following expression:

$$Z = size\_trg / size\_org$$

Then, at step F316, the control section 27 executes zoom control with the zoom magnification Z.

The procedure of the tentative composition adjustment illustrated in FIG. 21B is an example to the end. For example, after zoom control is carried out first, pan-tilt control may be carried out. Further, the horizontal offset amount Δx and vertical offset amount Δy can be calculated also taking size variation of an image pickup object by the zoom magnification into consideration.

If such tentative composition adjustment as described above is carried out and OK decision is obtained with regard to the tentative composition at step F210 in FIG. 20, or in other words, if the image pickup object gravity center G or the integrated image pickup object gravity center GG is positioned within the target range TA for the tentative composition, then processes of the actual composition at steps F212 and F213 are carried out. In particular, the normal composition adjustment is carried out.

The processes for a regular composition at steps F212 and F213 are the ordinary composition process described hereinabove and are those, for example, described hereinabove with reference to FIGS. 11 to 14B.

In particular, after decision of a picture structure based on the image pickup object detection result, that is, after decision of the number of image pickup objects in the picture range, the image pickup object size, the direction of the face and so forth, is carried out, it is decided based on information of the picture structure decided by the picture structure decision in accordance with a predetermined algorithm whether or not the regular composition is an optimum composition.

Then, if the regular composition is not an optimum composition, then the image pickup visual field is varied by pan-tilt and zoom control as the regular composition adjustment at step F213.

It is to be noted that, as described hereinabove with reference to FIG. 10, if pan-tilt and zoom control is carried out as the composition adjustment, then the processing is carried out again beginning with the image pickup object detection processing at step F2 after step F3. In regard to FIG. 20, when the composition adjustment is carried out at step F213, the processing is carried out again beginning with step F201.

The regular composition adjustment at step F213 is carried out, for example, in accordance with such a process as illustrated in FIG. 21A.

Referring first to FIG. 21A, at step F300, the control section 27 sets a target range TA for obtaining an optimum composition. For example, the control section 27 sets a target range TA in such a manner as illustrated in FIGS. 13A and 13B.

At steps F301 to F306, processes similar to those at steps F311 to F316 described hereinabove with reference to FIG. 21B as the tentative composition adjustment described hereinabove are carried out, respectively.

Also the procedure of the regular composition adjustment of FIG. 21A is an example to the end. For example, the pan-tilt control may be carried out after the zoom control is carried out first. Also it is possible to calculate the horizontal offset amount Δx and the vertical offset amount Δy taking the size variation of an image pickup object by the zoom magnification into consideration.

If OK decision is obtained at step F212, then the composition process is ended, and the processing advances to step F4.

As described above, the composition process is carried out at two stages of the tentative composition adjustment and the regular composition adjustment.

Consequently, as a still picture image in the automatic still picture image pickup mode, an image which includes a number of persons as great as possible within the picture angle range can be picked up automatically.

It is to be noted that, while, as a technique for tentative composition adjustment, the example wherein the target range TA is set to the near side in the search direction is described, some other particular technique may be used.

For example, it seems a possible idea to carry out, when an image pickup object is detected, tentative composition adjustment based on the image pickup object and then carry out search around the image pickup object to confirm whether or not some other image pickup object exists. Or, an example may be used that, when an image pickup object is detected, search around the image pickup object is carried out simply.

4. Modifications to the Functional Configuration

While process examples of an embodiment have been described, the processes are described as control processes based on the functional configuration described hereinabove with reference to FIG. 9.

For example, in the image pickup system which includes the digital still camera 1 and the camera platform 10, different configuration examples may be applied in addition to the configuration of FIG. 9. In the following, several examples are described.

Figure 22:
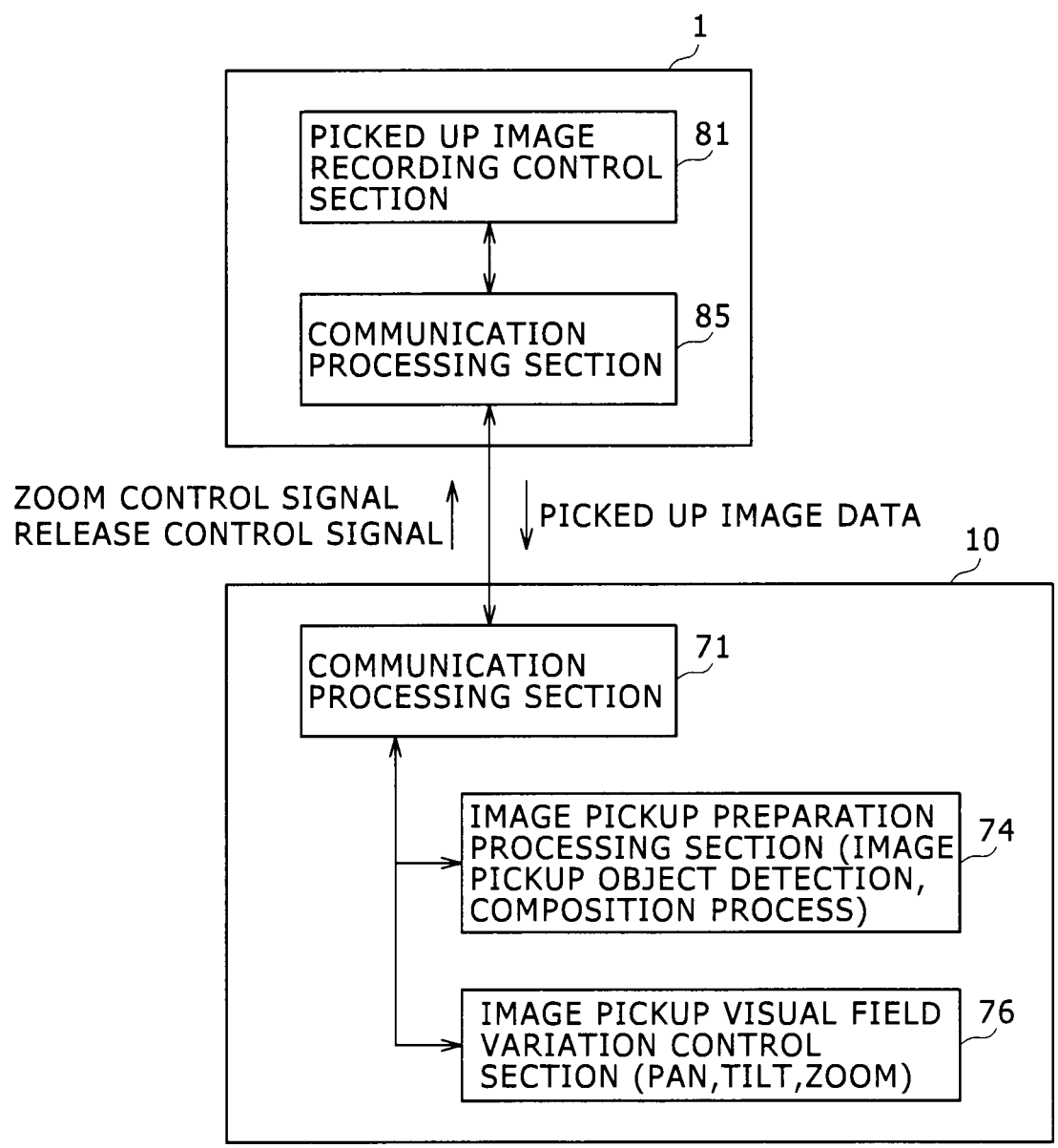
FIG. 22 is a block diagram showing a configuration of control functions of the digital still camera and the camera platform.

Referring to FIG. 22, in the configuration example shown, only a picked up image recording control section 81 and a communication processing section 85 are provided. Meanwhile, on the camera platform 10 side, particularly in the control section 51, a communication processing section 71, an image pickup preparation processing section 74 and an image pickup visual field variation control section 75 are provided.

Although control processes executed by the functional blocks are substantially similar to those described hereinabove with reference to FIG. 9, they are different in the following points.

In particular, the image pickup preparation processing section 74 receives supply of picked up image data as frame images from the signal processing section 24 of the digital still camera 1 in order to carry out an image pickup object process and a composition process. More particularly, the picked up image data are supplied from the digital still camera 1 to the camera platform 10 side by communication between the communication processing sections 85 and 71. Then, the image pickup preparation processing section 74 carries out image analysis of the received picked up image data and carries out an image pickup object process and a composition process similar to those described hereinabove.

The image pickup visual field variation control section 75 controls the pan driving section 55 and the tilt driving section 58 in accordance with an instruction from the image pickup preparation processing section 74 to execute pan-tilt operation for image pickup object detection and composition adjustment.

Meanwhile, for zoom control, the image pickup preparation processing section 74 outputs a zoom control signal to the control section 27, particularly to the picked up image recording control section 81, of the digital still camera 1 side through the communication processing section 71. The picked up image recording control section 81 controls execution of a zoom process for composition adjustment in accordance with the zoom control signal.

Further, at a point of time at which the composition process is completed, the image pickup preparation processing section 74 outputs a release control signal to the control section 27, particularly to the picked up image recording control section 81, of the digital still camera 1 side through the communication processing section 71. The picked up image recording control section 81 may carry out the processes at steps F4 and F5 of FIG. 10 in accordance with the release control signal.

In short, in the case of the functional configuration of FIG. 22, the processes at steps F2 and F3 of FIG. 10 are carried out by the control section 51, and the processes at steps F1, F4 and F5 are carried out by the control section 27 of the digital still camera 1.

As a modification to the configuration example of FIG. 22, an example corresponding to a case in which the image pickup section 63 is provided on the camera platform 10 side as mentioned hereinabove with reference to FIG. 8 may be applicable.

In this instance, the image pickup preparation processing section 74 shown in FIG. 22 receives frame image data not from the digital still camera 1 side but from the image pickup section 63. Then, the image pickup preparation processing section 74 carries out image analysis and then carries out an image pickup object process and a composition process similar to those described hereinabove.

While configuration examples of the control functions are described above, naturally further various control functional configurations are possible.

As can be recognized from such configurations, the image pickup control apparatus of the present invention can be implemented not only as a control functional configuration as the digital still camera 1 but also as a control functional configuration as the camera platform 10. Further, the image pickup control apparatus of the present embodiment can be implemented also as a control functional configuration of an image pickup system which includes the digital still camera 1 and the camera platform 10. In other words, the digital still camera 1, the camera platform 10 and the image pickup system which includes the digital still camera 1 and the camera platform 10 can be provided as the image pickup control apparatus of the present embodiment or as products by which the image pickup control method of the present embodiment is carried out.

It is to be noted that, while FIGS. 9 and 22 illustrates the individual control functional sections as blocks, they need not be configured as program modules or pieces of hardware which are independent of each other. In fact, they may be configured in any manner only if the processing operations described in the foregoing description of the embodiment are implemented as combined processes of the control functional sections.

5. Other Embodiments

Although an example wherein the present invention is applied to the image pickup system which includes the digital still camera 1 and the camera platform 10 is described above as an embodiment of the present invention, the present invention can be carried out in various other embodiments.

Here, an image processing apparatus 500 as an embodiment of the present invention which has a more popular configuration is described.

Figure 23:
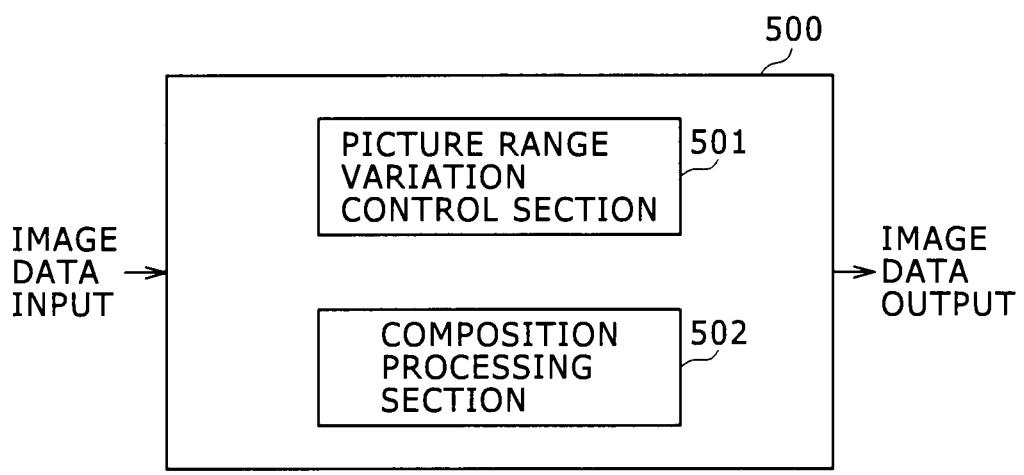
FIG. 23 is a diagrammatic view illustrating a functional configuration of the image processing apparatus.

FIG. 23 shows an example of a functional configuration of the image processing apparatus 500. The image processing apparatus 500 is implemented by calculation processing of a CPU, a DSP and so forth.

Referring to FIG. 23, the image processing apparatus 500 includes a picture range variation control section 501 and a composition processing section 502 as a functional configuration thereof. The image processing apparatus 500 carries out a composition process for image data input thereto. While the image pickup system of the embodiment described hereinabove carries out a composition process for picked up image data, the image processing apparatus 500 carries out a composition process not only for picked up image data but also various image data input thereto.

For example, the image processing apparatus 500 carries out a composition process for image data reproduced and input from a recording medium, image data received through wired or wireless communication, and so forth.

The picture range variation control section 501 carries out variation setting of the picture range for image data input thereto. For example, the picture range variation control section 501 sets a picture range as a range within which trimming or cutting out is to be carried out among the image data. While, in the image pickup system described hereinabove, the variation setting of a picture range is executed as variation of the image pickup visual field by pan-tilt and zoom operations, in this instance, it should be executed by a process of varying the setting of the pixel range to be output from within the range of all pixels of the input image data.

The composition processing section 502 carries out detection of a target image and a composition process while setting variation of the extent of the picture range by the picture range variation control section 501 is carried out. Particularly as the composition process, two stages of processing of the tentative composition adjustment and the regular composition adjustment are carried out.

Then, part of the input picked up image data determined by the composition process are output as image data after the processing.

Figure 24:
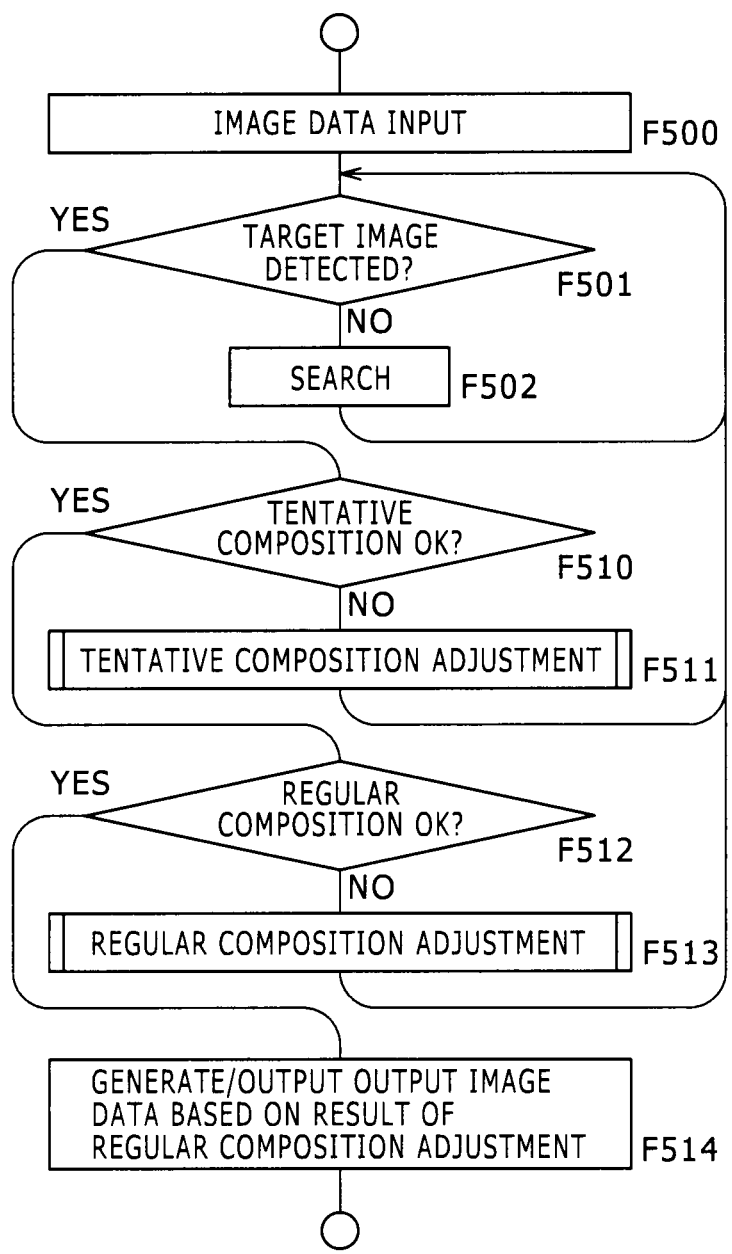
FIG. 24 is a flow chart illustrating a process of image processing apparatus of the image pickup system.

An example of the processing is illustrated in FIG. 24.

The image processing apparatus 500 receives image data at step F500.

Then at step F501, the composition processing section 502 confirms whether or not a target image pickup object is detected, for example, within a predetermined pixel range of the input image data.

If a target image pickup object is not detected, then the composition processing section 502 executes a search process at step F502. Then, the composition processing section 502 confirms presence/absence of the target image at step F501.

The processes at steps F501 and F502 are carried out by the composition processing section 502 for confirming presence/absence of detection of a target image while the picture range variation control section 501 successively varies the object image range.

If the target image is detected, then the composition processing section 502 first carries out a tentative composition process.

In particular, the composition processing section 502 carries out confirmation of whether or not the tentative composition is in an optimum composition state at step F510 and carries out tentative composition adjustment at step F511. The processes may be considered similar to the processes described hereinabove with reference to FIGS. 17 and 19 while it is taken into consideration that it is different in that the variation setting of the image pickup visual field is replaced by the variation setting of the pixel range as the picture range.

If it is decided at step F510 after the tentative composition process is carried out that the tentative composition is OK, then processes for a regular composition at steps F512 and F513 are carried out. In short, an ordinary composition process is carried out.

The processes for a regular composition at steps F512 and F513 may be considered similar to those described hereinabove with reference to FIGS. 11 to 14B.

Then, if OK decision of the regular composition is obtained at step F512, then the composition process is ended, and the processing advances to step F514. At step F514, the image processing apparatus 500 cuts out the image data within the set pixel range as the regular composition and outputs the cut out image data as output image data.

In the image processing apparatus 500 having such a configuration as described above, as an example, a process of trimming part of original input image data with a face image of a person set as a target image can be carried out.

Consequently, in a process of producing output image data by cutting out an arbitrary pixel range from input image data, for example, image data including a maximum number of persons can be automatically generated and output.

It is to be noted that such an image processing apparatus 500 as described above applies the composition process of the embodiment of the image pickup system described hereinabove to a general image data process.

Then, the image process or composition process can be applied widely not only to an image process as trimming but also to pixel range setting among image data. For example, the image process or composition process can be applied, for example, also to setting of a partial pixel range for which an image effect is to carried out from among input image data, setting of a pixel range for which masking is to be carried out, and so forth.

6. Program

A program according to the present embodiment causes a processor such as a CPU to execute the processing operations of the embodiments described hereinabove. Particularly, the program implements the composition processes described hereinabove with reference to FIGS. 10, 20, 21A and 21B, 24 and so forth by being started up by the control section 27 or 51.

The program can be recorded in advance in a HDD (Hard Disk Drive) as a recording medium built in such an apparatus as a personal computer, the digital still camera 1 or the camera platform 10, a ROM in a microcomputer having a CPU and so forth.

Or, the program may be stored or recorded temporarily or permanently on or in a removable recording medium such as a flexible disk, a CD-ROM (Compact Disc Read Only Memory), an MO (Magnet-Optical) disk, a DVD (Digital Versatile Disc), a blu ray disk, a magnetic disk, a semiconductor memory or a memory card. Such a removable recording medium as just mentioned can be provided as package software.

Or, the program may be installed from a removable recording medium into a personal computer or the like or may be downloaded from a download site through a network such as a LAN (Local Area Network) or the Internet.

The program of the present embodiment is suitable for implementation and wide-range provision of an image pickup apparatus and an image pickup system which implement the processes of the embodiments described hereinabove.

The present application contains subject matter related to that disclosed in Japanese Priority Patent Application JP 2009-297172 filed in the Japan Patent Office on Dec. 28, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
a picture range variation control section configured to variably set a picture range extent of image data; and
a composition processing section configured to detect whether or not a target image is included in a picture range while the picture range extent is variably set by said picture range variation control section and carry out, when one or more target images are detected, a composition determination process including confirmation of a different target image around the detected target image or images,
wherein the composition determination process includes: a tentative composition adjustment process for carrying out composition adjustment while an image pickup visual field is varied, by the picture range variation control section, to confirm the different target image and a regular composition adjustment process for varying the image pickup visual field in order to optimize a composition after completion of the tentative composition adjustment process, a variation width of the image pickup visual field in the tentative composition adjustment process being greater than a variation width of the image pickup visual field in the regular composition adjustment process.

2. The image processing apparatus according to claim 1, wherein the image data are picked up image data in an image pickup apparatus configured to carry out pickup of an image of an image pickup object and recording of picked up image data into or on a recording medium;
the target image being an image of a target image pickup object;
said picture range variation control section being an image pickup visual field variation control section configured to control driving of a variation mechanism for the image pickup visual field in the image pickup apparatus;
said composition processing section being an image pickup preparation processing section configured to detect whether or not the target image pickup object is included in the image pickup visual field from the picked up image data of the image pickup apparatus while driving of the variation mechanism is controlled by said image pickup visual field variation control section and carry out, when one or more target image pickup objects are detected, the composition determination process, which includes confirmation of a different image pickup object around the detected target image pickup object or objects.

3. The image processing apparatus according to claim 2, wherein:
the tentative composition adjustment process carries out, when one or more target image pickup objects are detected, the composition adjustment while the image pickup visual field is varied so that the different image pickup object around the detected target image pickup object or objects can be confirmed.

4. The image processing apparatus according to claim 3, wherein the tentative composition adjustment process is carried out as a process for controlling driving of the variation mechanism so that the center of gravity regarding the one or more detected target image pickup objects is placed within a target range set in the picture range; and setting of the target range is different between the tentative composition adjustment process and the regular composition adjustment process.

5. The image processing apparatus according to claim 4, wherein the target range upon the tentative composition adjustment process is set such that the variation width of the image pickup visual field is greater than the variation width of the image pickup visual field upon the regular composition adjustment process.

6. The image processing apparatus according to claim 2, wherein said image pickup visual field variation control section carries out, as the variation mechanism, driving control for a pan mechanism, a tilt mechanism or a zoom mechanism.

7. The image processing apparatus according to claim 2, wherein the composition determination process is executed as a process to be executed when automatic still picture image pickup operation which does not depend upon a release operation by a user is carried out.

8. An image processing method for image data, comprising the steps of:
variably setting a picture range extent of image data;
detecting whether or not a target image is included in a picture range while the picture range extent is variably set; and
carrying out, when one or more target images are detected, a composition determination process including confirmation of a different target image around the detected target image,
wherein the composition determination process includes:
carrying out a tentative composition adjustment process for carrying out composition adjustment while an image pickup visual field is varied, by a picture range variation control section, to confirm the different target image, and
carrying out a regular composition adjustment process for varying the image pickup visual field in order to optimize a composition after completion of the tentative composition adjustment process, a variation width of the image pickup visual field in the tentative composition adjustment process being greater than a variation width of the image pickup visual field in the regular composition adjustment process.

9. An image processing method for an image pickup apparatus or an image pickup system which includes a still picture image pickup section configured to carry out image pickup of an image pickup object and recording of picked up image data into or on a recording medium and an image pickup visual field variation mechanism for the still picture image pickup section, comprising the steps of:
detecting whether or not a target image pickup object is included in an image pickup visual field from the picked up image data of the image pickup apparatus while driving of the variation mechanism is controlled; and
carrying out, when one or more target image pickup objects are detected, a composition determination process including confirmation of a different image pickup object around the detected image pickup object or objects,
wherein the composition determination process includes:
carrying out a tentative composition adjustment process for carrying out composition adjustment while the image pickup visual field is varied, by a picture range variation control section, to confirm the different target image, and
carrying out a regular composition adjustment process for varying the image pickup visual field in order to optimize a composition after completion of the tentative composition adjustment process, a variation width of the image pickup visual field in the tentative composition adjustment process being greater than a variation width of the image pickup visual field in the regular composition adjustment process.

10. A non-transitory computer-readable storage medium having computer readable program codes embodied in the computer readable storage medium that, when executed cause a computer to execute a control processing program for an image processing apparatus configured to carry out a process for image data, the control processing program causing a calculation processing apparatus to execute the steps of:

variably setting a picture range extent of image data;

detecting whether or not a target image is included in a picture range while the picture range extent is variably set; and carrying out, when one or more target images are detected, a composition determination process including confirmation of a different target image around the detected target image, wherein the composition determination process includes:

carrying out a tentative composition adjustment process for carrying out composition adjustment while an image pickup visual field is varied, by a picture range variation control section, to confirm the different target image, and carrying out a regular composition adjustment process for varying the image pickup visual field in order to optimize a composition after completion of the tentative composition adjustment process, a variation width of the image pickup visual field in the tentative composition adjustment process being greater than a variation width of the image pickup visual field in the regular composition adjustment process.

11. A non-transitory computer-readable storage medium having computer readable program codes embodied in the computer readable storage medium that, when executed cause a computer to execute a control processing program for an image pickup apparatus or an image pickup system which includes a still picture image pickup section configured to carry out image pickup of an image pickup object and recording of picked up image data into or on a recording medium and an image pickup visual field variation mechanism for the still picture image pickup section, the control processing program causing a calculation processing apparatus to execute the steps of:

detecting whether or not a target image pickup object is included in an image pickup visual field from the picked up image data of the image pickup apparatus while driving of the variation mechanism is controlled; and carrying out, when one or more target image pickup objects are detected, a composition determination process including confirmation of a different image pickup object around the detected image pickup object or objects, wherein the composition determination process includes:

carrying out a tentative composition adjustment process for carrying out composition adjustment while the image pickup visual field is varied, by a picture range variation control section, to confirm the different target image, and carrying out a regular composition adjustment process for varying the image pickup visual field in order to optimize a composition after completion of the tentative composition adjustment process, a variation width of the image pickup visual field in the tentative composition adjustment process being greater than a variation width of the image pickup visual field in the regular composition adjustment process.

12. An image processing apparatus, comprising:

picture range variation control means for variably setting a picture range extent of image data; and composition processing means for detecting whether or not a target image is included in a picture range while the picture range extent is variably set by said picture range variation control means and carrying out, when one or more target images are detected, a composition determination process including confirmation of a different target image around the detected target image or images, wherein the composition determination process includes: a tentative composition adjustment process for carrying out composition adjustment while an image pickup visual field is varied, by the picture range variation control means, to confirm the different target image and a regular composition adjustment process for varying the image pickup visual field in order to optimize a composition after completion of the tentative composition adjustment process, a variation width of the image pickup visual field in the tentative composition adjustment process being greater than a variation width of the image pickup visual field in the regular composition adjustment process.

13. An image processing apparatus, comprising:

a picture range variation control section configured to variably set a picture range extent of image data, said picture range variation control section being an image pickup visual field variation control section configured to control driving of a variation mechanism for an image pickup visual field in the image pickup apparatus; and a composition processing section configured to detect whether or not a target image is included in a picture range while the picture range extent is variably set by said picture range variation control section and carry out, when one or more target images are detected, a composition determination process including confirmation of a different target image around the detected target image or images, wherein the image data are picked up image data in an image pickup apparatus configured to carry out pickup of an image of an image pickup object and recording of picked up image data into or on a recording medium, the target image being an image of a target image pickup object, said composition processing section being an image pickup preparation processing section configured to detect whether or not the target image pickup object is included in the image pickup visual field from the picked up image data of the image pickup apparatus while driving of the variation mechanism is controlled by said image pickup visual field variation control section and carry out, when one or more target image pickup objects are detected, the composition determination process, which includes confirmation of a different image pickup object around the detected target image pickup object or objects, wherein the composition determination process includes: a tentative composition adjustment process for carrying out, when one or more target image pickup objects are detected, composition adjustment while the image pickup visual field is varied so that a different image pickup object around the detected target image pickup object or objects can be confirmed, and a regular composition adjustment process for varying the image pickup visual field in order to optimize a composition after completion of the tentative composition adjustment process, wherein the tentative composition adjustment process is carried out as a process for controlling driving of the variation mechanism so that the center of gravity regarding the one or more detected target image pickup objects is placed within a target range set in the picture range, and setting of the target range is different between the tentative composition adjustment process and the regular composition adjustment process, wherein the target range upon the tentative composition adjustment process is set such that a variation width of the image pickup visual field is greater than a variation width of the image pickup visual field upon the regular composition adjustment process.

\* \* \* \* \*